(12) United States Patent
Astavans et al.

(10) Patent No.: US 10,509,964 B2
(45) Date of Patent: Dec. 17, 2019

(54) TOGGLE VIEW FUNCTIONS FOR TELECONFERENCING SESSIONS

(71) Applicant: Microsoft Technology Licensing, LLC, Redmond, WA (US)

(72) Inventors: Ruchir Astavans, Redmond, WA (US); Jason Thomas Faulkner, Seattle, WA (US); Kevin D Morrison, Arlington, MA (US); Michael H Hill, Shoreline, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 111 days.

(21) Appl. No.: 15/404,138

(22) Filed: Jan. 11, 2017

(65) Prior Publication Data

US 2018/0196583 A1 Jul. 12, 2018

(51) Int. Cl.
*H04N 7/15* (2006.01)
*G06K 9/00* (2006.01)

(52) U.S. Cl.
CPC ......... *G06K 9/00711* (2013.01); *H04N 7/152* (2013.01)

(58) Field of Classification Search
CPC ......... H04M 3/42059; H04M 3/42102; H04M 3/533; H04M 3/53383; H04M 3/56–569; H04M 2203/50–509; G06K 9/00711
USPC .................. 348/14.01–14.16; 370/259–271, 370/351–357; 379/201.01, 379/202.01–207.01; 709/201–207, 709/217–248
See application file for complete search history.

(56) References Cited

U.S. PATENT DOCUMENTS

| | | | |
|---|---|---|---|
| 6,608,644 B1 * | 8/2003 | Kondo | H04N 7/15 348/14.07 |
| 7,007,098 B1 * | 2/2006 | Smyth | H04L 29/06027 348/E7.084 |
| 7,668,907 B1 * | 2/2010 | Janakiraman | H04L 12/1822 709/204 |

(Continued)

FOREIGN PATENT DOCUMENTS

KR 101632435 B1 6/2016

OTHER PUBLICATIONS

"iMeet", http://www.psimeeting.com/pdf/imeet.pdf, Published on: Nov. 2015, 36 pages.

(Continued)

*Primary Examiner* — Hemant S Patel
(74) *Attorney, Agent, or Firm* — Newport IP, LLC; Mike R. Cicero

(57) ABSTRACT

Systems and methods for hosting a teleconference session. Media data is received from a plurality of client computing devices at a server. The media data is combined into a teleconference stream configured to display a selected teleconference session view. The teleconference stream is transmitted to a client computing device having a display. The teleconference stream is displayed according to the teleconference session view, which includes a primary section displaying a first graphic element and at least one secondary section each including a user interface element having a toggle view function. The teleconference session view changes the display in the primary section to a second graphic element when a toggle actuation is detected at the user interface element of one of the secondary sections.

21 Claims, 23 Drawing Sheets

(56) References Cited

U.S. PATENT DOCUMENTS

| | | | |
|---|---|---|---|
| 8,289,368 B2* | 10/2012 | Gopal | H04L 12/1822 348/14.08 |
| 8,464,165 B2 | 6/2013 | van Os et al. | |
| 8,890,929 B2* | 11/2014 | Paithankar | H04N 7/152 348/14.01 |
| 9,158,444 B2 | 10/2015 | Boyer et al. | |
| 9,197,853 B2 | 11/2015 | Shi et al. | |
| 9,204,099 B2 | 12/2015 | Brown | |
| 9,229,633 B2 | 1/2016 | Feller et al. | |
| 9,325,938 B2* | 4/2016 | Paragano | H04N 7/141 |
| 2004/0001091 A1 | 1/2004 | Kressin | |
| 2004/0008249 A1* | 1/2004 | Nelson | H04N 7/147 348/14.09 |
| 2004/0008635 A1* | 1/2004 | Nelson | H04N 7/152 370/260 |
| 2004/0230651 A1* | 11/2004 | Ivashin | H04L 29/06027 709/204 |
| 2005/0099492 A1* | 5/2005 | Orr | H04L 12/1827 348/14.08 |
| 2010/0225737 A1* | 9/2010 | King | H04N 7/152 348/14.09 |
| 2012/0127262 A1* | 5/2012 | Wu | H04N 7/152 348/14.09 |
| 2012/0303834 A1 | 11/2012 | Adam et al. | |
| 2012/0317483 A1 | 12/2012 | Shapiro et al. | |
| 2013/0339451 A1* | 12/2013 | Nyberg | H04L 5/0064 709/204 |
| 2014/0101572 A1* | 4/2014 | Gunderson | G06F 9/4443 715/758 |
| 2015/0033146 A1 | 1/2015 | Wu et al. | |
| 2016/0073055 A1 | 3/2016 | Marsh | |

OTHER PUBLICATIONS

"Audio setup and making calls", https://d2oc0ihd6a5bt.cloudfront.net/wp-content/uploads/sites/247/2014/01/Microsoft-Skype-for-Business-Quick-Reference-Guide.pdf, Published on: Oct. 14, 2016, 10 pages.

"Cisco WebEx Mobile App for Android", https://www.webex.co.in/mobile/faq-android.html, Retrieved on: Oct. 14, 2016, 3 pages.

* cited by examiner

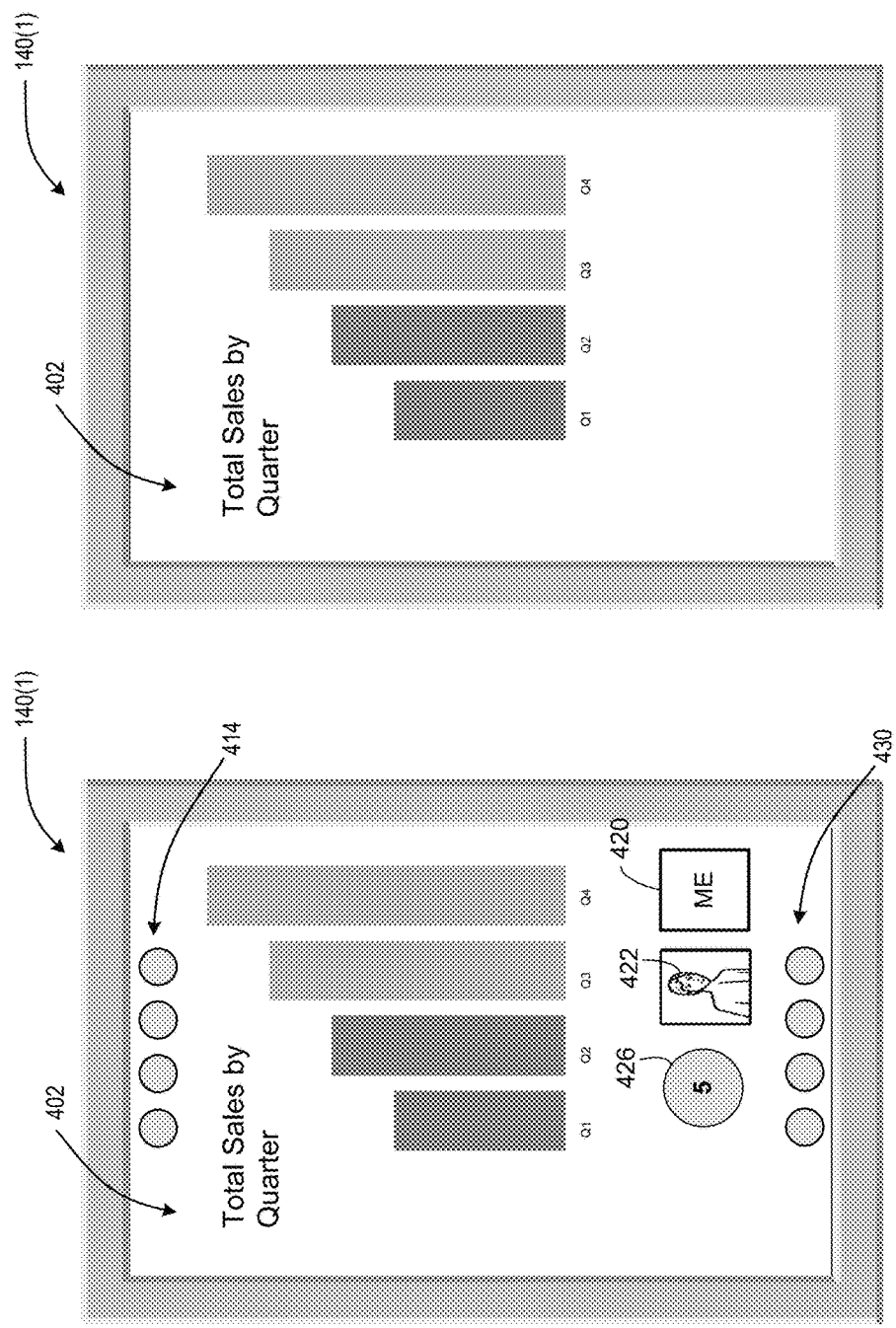

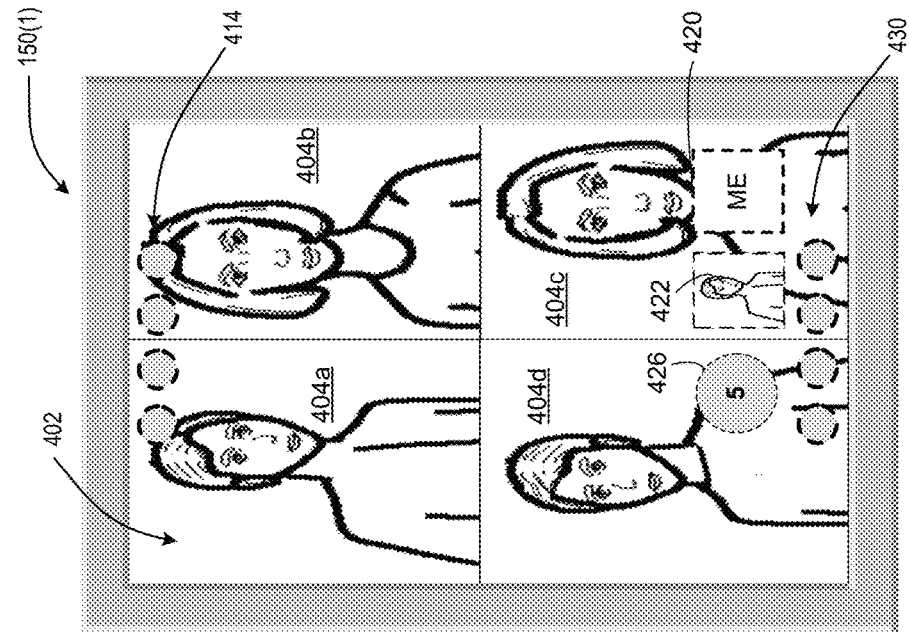
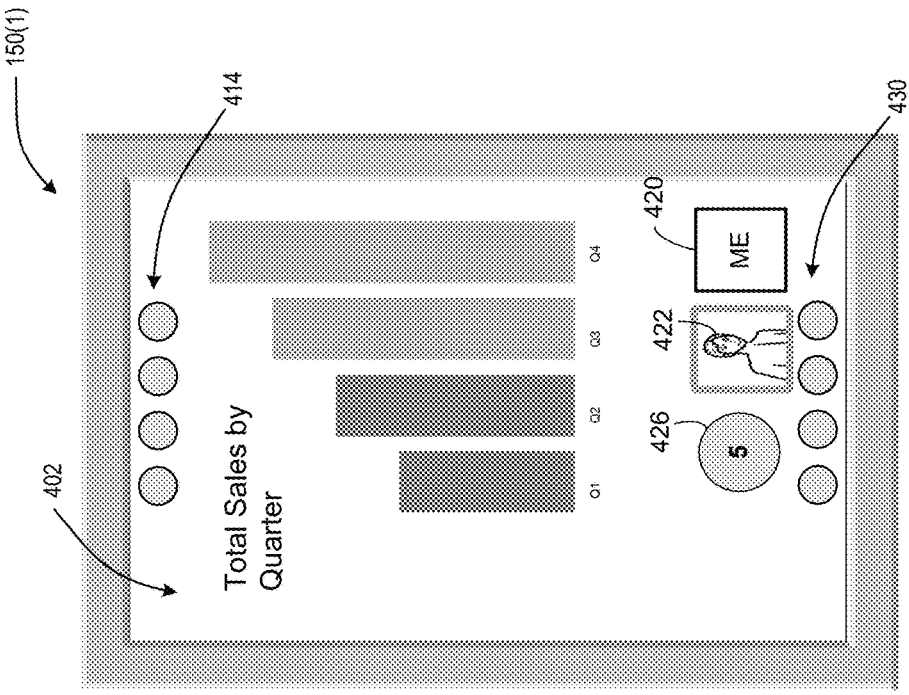

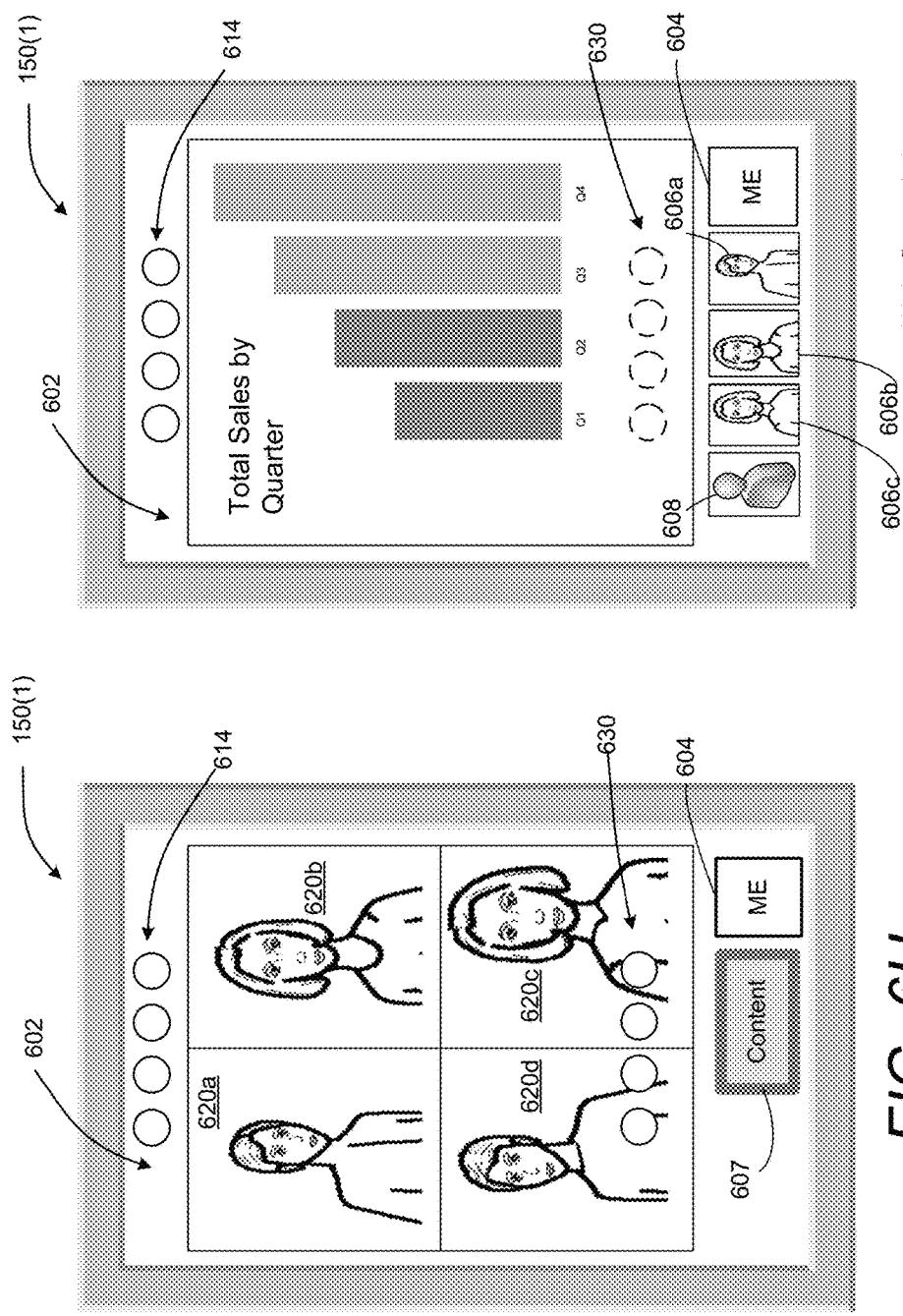

TOGGLE VIEW FUNCTIONS FOR TELECONFERENCING SESSIONS

BACKGROUND

At present, the use of teleconference systems in commercial and corporate settings has increased dramatically in facilitating meetings and conferences between people in remote locations, reducing the need for travel so as to bring these people physically together in order to conduct the meetings or conferences. In general, teleconference systems allow users (i.e., people) of a teleconference system, in two or more remote locations, to communicate interactively with each other via live, simultaneous two-way video streams, audio streams, or both. Some teleconference systems (such as, for example, Cisco WebEx provided by Cisco Systems, Inc. of San Jose, Calif., GoToMeeting provided by Citrix Systems, Inc. of Santa Clara, Calif., Zoom provided by Zoom Video Communications of San Jose, Calif., Google Hangouts by Alphabet Inc. of Mountain View, Calif., and Skype® provided by Microsoft Corporation, of Redmond, Wash.) also allow users to exchange digital documents such as, for example, images, text, video and any others.

A limitation to teleconference systems is that they do not allow users to experience the typical interactions that occur at live meetings when all the users are physically present at the same location. Most teleconference systems utilize remote communication devices (such as, for example, video terminals, personal computers (both desktop and portable) and mobile devices such as, for example, tablets, smartphones, etc.) that display video and play audio from the meeting, or conference, on a video display that may vary in size from approximately 3 inches to approximately 65 inches based on the type of communication devices or video display. As a result, the remote users of the teleconference system are typically limited to viewing the interactions of the meeting, or conference, through a "window" of the meeting, or conference, produced by the video display, which may be the screen of a mobile device, computer monitor, or large video display.

This results in a user interface that produces a flat "thumbnail" style people and content experience for the remote users of the teleconference system attending the meeting or conference. Generally, this user interface only allows users to see framed individuals (i.e., other people attending the meeting or conference) in a gallery experience with a lot of negative space in the user interface that is not engaging for the remote users.

Additionally, the remote users are simply monitoring cameras from fixed positions which may be located either at the location of the physical meeting, or conference, or at the location of other remote users attending the meeting, or conference. Moreover, in some teleconference systems, some remote users may see multiple displays of fixed streams of video data on their video displays with very few options for allowing each participant to change their views to see important or salient portions of the shared media. Therefore, the resulting user interface of these types of teleconference systems typically leaves the remote users bored and unengaged.

As such, there is a need for an improved teleconferencing system that addresses these issues. It is with respect to these and other considerations that the disclosure made herein is presented.

SUMMARY

The techniques disclosed herein provide toggle view functions for teleconferencing sessions. The features disclosed herein enable users to harness the power of video, content, and storytelling to transform a meeting experience through more life-like group engagement by allowing users to toggle between people and content in views during a communication event. The toggle view functions enable each participant of a teleconferencing system to engage with what is important to them. As will be described in more detail, the techniques disclosed herein provide toggle view functions for persistent and overlay views allowing the viewer or presenter, in synchronous or asynchronous experiences, to promote people or content to an active stage of a teleconferencing session, e.g., a primary section of a display screen.

In some embodiments, media data is received from a plurality of client computing devices at a server. The media data is combined into a teleconference stream configured to display a selected teleconference session view. The teleconference stream is transmitted to a client computing device having a display. The teleconference stream is displayed according to the teleconference session view, which includes a primary section displaying a first portion of shared media and a second section displaying a second portion of the shared media. The second section also includes a user interface element having a toggle view function. The teleconference session view toggles the display in the primary section and the second portion when a user actuation is detected at the user interface element.

The primary section or the secondary section of the interface can display and arrange select portions of the shared media according to a level of activity associated with the individual portions of the shared media. As will be described in more detail below, the selection and arrangement of the portions of shared media based on a level of activity, and in some cases the most dominant activity, enable a system to display streams that are important to the participants. In the examples described below, the system can provide a storied experience by enabling users to "follow the action" of a teleconference session.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

FIGS. 4G-4L are screenshot views of a display corresponding to one of the client computing devices in the teleconference session illustrating operation of the toggle view function in an overlay view where the client computing device is a mobile device, such as for example, a mobile phone.

FIGS. 6F-6K are screenshot views of a display corresponding to one of the client computing devices in the teleconference session illustrating operation of the toggle view function in a persistent view where the client computing device is a mobile device, such as for example, a mobile phone.

DETAILED DESCRIPTION

Figure 1:
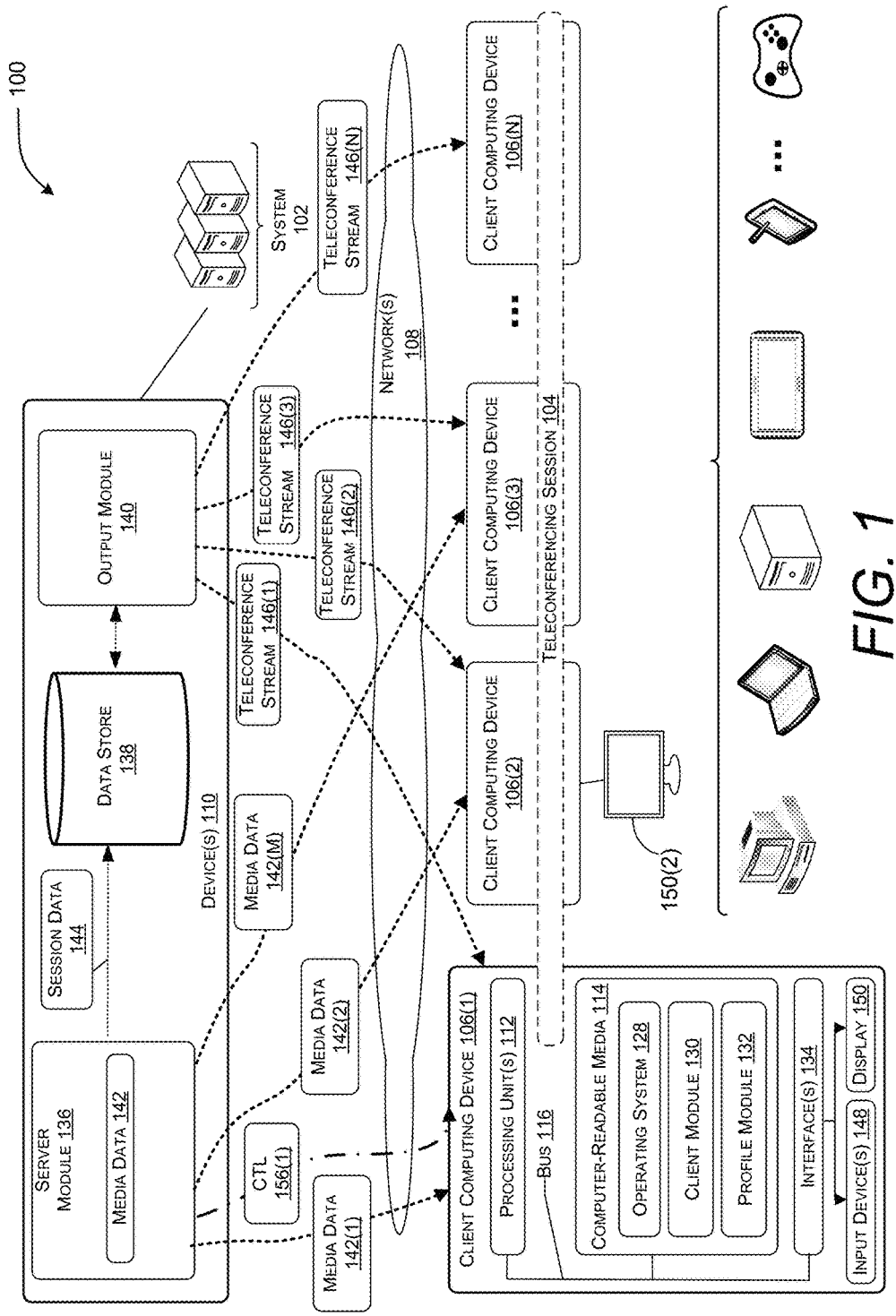
FIG. 1 is a block diagram of an example of a teleconference system.

Examples described below enable a system to provide a teleconference session at a client computing device with the capability of controlling the display of the session on the client computing device. The teleconference session may be controlled at a teleconference server connected to a plurality of client computing devices participating in the teleconference session. The client computing devices may be configured to allow the user to control his or her experience of the teleconference session using graphical user interface controls available during the session. In an example implementation, the teleconference session receives user media data from client computing devices used by the participants. The media data may also include content media data from one or more client computing devices, or another source. The teleconference session at the server combines portions of the media data into a teleconference stream and transmits the teleconference stream to each client computing device according to a teleconference session view configured for each client computing device.

The user media data may be audio and/or video signals representing the user of the client computing device at the source of the user media data signal. The content media data may be an image or video representing a document, video, audio or other media content that may be shared with the users of the client computing devices.

The teleconference session view may be tailored for each client computing device. For a given client computing device, the teleconference session view may be in an overlay view, a persistent view, or in other desired views. An overlay view provides a total display experience in which either people or content is viewed "on stage," which is a primary section of an interface. In some configurations, the primary section of an interface can be displayed in a manner that dominates the display on a user's client computing device. The overlay view allows a user to engage with the content being shared among the teleconference participants, or on the participants, at least the most active participants themselves. For illustrative purposes, an overlay view comprises at least one interface element that "overlaps" the primary section. User interface elements can display portions of the shared media data that correspond to participants and the content that is not being displayed on stage. In a user-ON state, the user elements are presented to allow the user to toggle the view from people to content, or vice versa. An overlay view also provides a secondary section that includes user interface elements displaying participants or content that are not displayed in the primary section. For instance, if content is displayed in the primary section, a video stream of participants can be displayed in the secondary section. As will be described in more detail below, the user interface elements in the secondary section can be displayed for a predetermined period of time and then fade after the predetermined period of time has lapsed. For illustrative purposes, when the user interface elements in the secondary section are displayed, the user interface is described herein as being in the "user-ON" state. When the secondary section is not displayed, the user interface is described herein as being in the "user-OFF" state. The user-OFF state allows a display of on-stage media without the display of the overlaid user interface elements. In addition, in the overlay view, the secondary section overlaps the primary section. In some configurations, the primary section is larger than then secondary section. For illustrative purposes, such an arrangement is described herein as an overlapping configuration.

The overlay view may be displayed in a "windowed mode," which includes a frame around the primary section, wherein the frame comprises control user interface elements for controlling aspects of the windows, such as minimizing, maximizing, or closing the user interface. The overlay view may be displayed in an "immersive mode," which does not include a frame. In the immersive mode, the primary section can occupy the entire display area of a device.

In the persistent view, the content or participants are displayed in the primary section, where the primary section occupies a majority of the display leaving space for a secondary section. In the persistent view, the secondary section does not overlap the primary section, such an arrangement is described herein as a side-by-side configuration. The secondary section includes user interface elements that displays participants or content that are not displayed in the primary section. The secondary section is visibly under-emphasized, at least in size, compared to the primary section. The user interface elements in the secondary section remain displayed without a timeout feature.

The persistent view may be displayed in a "windowed mode," which includes a frame around the primary section, wherein the frame comprises control user interface elements for controlling aspects of the windows, such as minimizing, maximizing, or closing the user interface. The persistent view may be displayed in an "immersive mode," which does not include a frame. In the immersive mode, the primary section and the secondary section, arranged in the side-by-side configuration, can occupy the entire display area of a device.

It is noted that the teleconference session may be viewed on the display in an application window on the display screen with other windows that may be operating on other applications. In some implementations, a user may configure the teleconference application to display on the entire display screen. When the teleconference application displays in an application window, the overlay and persistent views are operating in either an overlay-windowed or persistent-windowed view. When the teleconference application displays using the entire display screen, the overlay and persistent views are operating in either an overlay-immersive view or persistent-immersive view. In this description, it is to be understood that the overlay and persistent views are displayed on the screen regardless of whether the display is in a windowed or in an immersive state.

As will be described in more detail below, in response to one or more actions, the system can swap the items (content or people) displayed in the primary section for items that are displayed in the secondary section, and the system can swap items displayed in the secondary section for items that are displayed in the primary section. Such a process of swapping displayed items is described herein as "toggling" the views. The process of toggling the views can occur in either the overlay view or the persistent view. The actions that cause a toggling of the views can include, but are not limited to, receiving a user input, receiving a user voice command, receiving a command issued by a remote computer, etc.

User interface elements are also provided to allow the user to switch between overlay and persistent views. Other views in addition to the overlay and persistent views are provided. The user may be provided with tools to switch between the views to alter the user's experience of the teleconference session.

In FIG. 1, a diagram illustrating an example of a teleconferencing system 100 is shown in which a system 102 can control the display of a teleconference session 104 (also referred to herein as a "teleconferencing session 104") in accordance with an example implementation. In this example, the teleconference session 104 is between a number of client computing devices 106(1) through 106(N) (where N is a positive integer number having a value of two or greater). The client computing devices 106(1) through 106(N) enable users to participate in the teleconference session 104. In this example, the teleconference session 104 may be hosted, over one or more network(s) 108, by the system 102. That is, the system 102 may provide a service that enables users of the client computing devices 106(1) through 106(N) to participate in the teleconference session 104. As an alternative, the teleconference session 104 may be hosted by one of the client computing devices 106(1) through 106(N) utilizing peer-to-peer technologies.

The system 102 includes device(s) 110 and the device(s) 110 and/or other components of the system 102 may include distributed computing resources that communicate with one another, with the system 102, and/or with the client computing devices 106(1) through 106(N) via the one or more network(s) 108. In some examples, the system 102 may be an independent system that is tasked with managing aspects of one or more teleconference sessions 104. As an example, the system 102 may be managed by entities such as SLACK®, WEBEX®, GOTOMEETING®, GOOGLE HANGOUTS®, etc.

Network(s) 108 may include, for example, public networks such as the Internet, private networks such as an institutional and/or personal intranet, or some combination of private and public networks. Network(s) 108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 108 may utilize communications protocols, including packet-based and/or datagram-based protocols such as Internet protocol ("IP"), transmission control protocol ("TCP"), user datagram protocol ("UDP"), or other types of protocols. Moreover, network(s) 108 may also include a number of devices that facilitate network communications and/or form a hardware basis for the networks, such as switches, routers, gateways, access points, firewalls, base stations, repeaters, backbone devices, and the like.

In some examples, network(s) 108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, and so forth), and other standards.

In various examples, device(s) 110 may include one or more computing devices that operate in a cluster or other grouped configuration to share resources, balance load, increase performance, provide fail-over support or redundancy, or for other purposes. For instance, device(s) 110 may belong to a variety of classes of devices such as traditional server-type devices, desktop computer-type devices, and/or mobile-type devices. Thus, although illustrated as a single type of device—a server-type device—device(s) 110 may include a diverse variety of device types and are not limited to a particular type of device. Device(s) 110 may represent, but are not limited to, server computers, desktop computers, web-server computers, personal computers, mobile computers, laptop computers, mobile phone, tablet computers, or any other sort of computing device.

A client computing device (e.g., one of client computing device(s) 106(1) through 106(N)) may belong to a variety of classes of devices, which may be the same as, or different from, device(s) 110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality (AR) device, an implanted computing device, an automotive computer, a network-enabled television, a thin client, a terminal, an Internet of Things ("IoT") device, a work station, a media player, a personal video recorders ("PVR"), a set-top box, a camera, an integrated component (e.g., a peripheral device) for inclusion in a computing device, an appliance, or any other sort of computing device. In some implementations, a client computing device includes input/output ("I/O") interfaces that enable communications with input/output devices such as user input devices including peripheral input devices (e.g., a display 150, a game controller, a keyboard, a mouse, a pen, a voice input device, a touch input device, a gestural input device, and the like) and/or output devices including peripheral output devices (e.g., a display, a printer, audio speakers, a haptic output device, and the like).

Client computing device(s) 106(1) through 106(N) of the various classes and device types can represent any type of computing device having one or more processing unit(s) 112 operably connected to computer-readable media 114 such as via a bus 116, which in some instances can include one or more of a system bus, a data bus, an address bus, a PCI bus, a Mini-PCI bus, and any variety of local, peripheral, and/or independent buses.

Executable instructions stored on computer-readable media 114 may include, for example, an operating system 128, a client module 130, a profile module 132, and other modules, programs, or applications that are loadable and executable by processing units(s) 112.

Client computing device(s) 106(1) through 106(N) may also include one or more interface(s) 134 to enable communications with other devices such as network interfaces, cameras, keyboards 148, touch screens 106(3), and pointing devices (mouse). For example, the interface(s) 134 enable communications between client computing device(s) 106(1) through 106(N) and other networked devices, such as device(s) 110 and/or devices of the system 102, over network(s) 108. Such network interface(s) 134 may include one or more network interface controllers (NICs) or other types of transceiver devices to send and receive communications and/or data over a network.

In the example environment 100 of FIG. 1, client computing devices 106(1) through 106(N) may use their respective client modules 130 to connect with one another and/or other external device(s) in order to participate in the teleconference session 104. For instance, a first user may utilize a client computing device 106(1) to communicate with a second user of another client computing device 106(2). When executing client modules 130, the users may share data, which may cause the client computing device 106(1) to connect to the system 102 and the other client computing devices 106(2) through 106(N) over the network 108.

The client module 130 of each client computing device 106(1) through 106(N) may include logic that detects user input and communicates control signals to the server module 136 to request changes in the view of the teleconference session on the display. For example, the client module 130 in the first client computing device 106(1) in FIG. 1 may detect a user input at an input device 148. The user input may be sensed, for example, as a finger press on a user interface element displayed on a touchscreen, or as a click of a mouse on a user interface element selected by a pointer on the display 150. The client module 130 translates the user input according to a function associated with the selected user interface element. In some cases, the client module 130 may require the teleconference session 104 to perform a function. In this case, the client module 130 sends a control signal 156(1) to the server module 136 for service by the teleconference session 104.

In one example function, the user of the client computing device 106(1) may wish to toggle the view on the display 150 of the client computing device 106(1) to emphasize content over media relating to the participants of the teleconference session 104, or conversely, to emphasize the view of the participants, or at least the most active participants, of the teleconference session 104 over content available to share among the participants. The user may click on the desired user interface element on the user's display 150. In response, the client module 130 sends the control signal 156(1) to a server on the device 110 hosting the teleconference session. The server would, in response to the control signal 156(1) perform the desired toggling of the views on the user's display 150 by re-configuring the view in a telecommunications stream 146(1) communicated to the client computing device for display.

In another example function, the user at a client computing device 106 participating in the teleconference session 104 may wish to change the view from overlay to persistent, or vice versa. The user may select one of several user interface elements on the display to transmit a control signal 156 to the server 136 to re-configure the teleconference session view to conform with the requested view.

The client computing device(s) 106(1) . . . 106(N) may use their respective profile module 132 to generate participant profiles, and provide the participant profiles to other client computing devices and/or to the device(s) 110 of the system 102. A participant profile may include one or more of an identity of a participant (e.g., a name, a unique identifier ("ID"), etc.), participant data, such as personal data and location data may be stored. Participant profiles may be utilized to register participants for teleconference sessions.

As shown in FIG. 1, the device(s) 110 of the system 102 includes a server module 136, a data store 138, and an output module 140. The server module 136 is configured to receive, from individual client computing devices 106(1) through 106(N), media data 142(1) through 142(M) (where M is a positive integer number equal to 2 or greater). In some scenarios, not all the client computing devices utilized to participate in the teleconference session 104 provide an instance of media data 142, and thus, M (the number of instances submitted) may not be equal to N (the number of client computing devices). In some other scenarios, one or more of the client computing devices may be communicating an additional stream or transmission of media data that includes content, such as a document or other similar type of media intended to be shared during the teleconference session.

The server module 136 is also configured to receive, generate and communicate session data 144 and to store the session data 144 in the data store 138. In various examples, the server module 136 may select aspects of the media data 142 that are to be shared with the client computing devices 106(1) through 106(N). The output module 140 may communicate the output teleconference stream 146 to the client computing devices 106(1) through 106(N). Specifically, in this example, the output module 140 is configured to communicate output teleconference stream 146(1) to client computing device 106(1), output teleconference stream 146(2) to client computing device 106(2), output teleconference stream 146(3) to client computing device 106(3), and output teleconference stream 146(N) to client computing device 106(N), respectfully.

Each output teleconference stream 146(1) through 146(N) may communicate audio that may include video representative of the contribution of each participant in the teleconference session 104. Each output teleconference stream 146(1) through 146(N) may also be formatted in a manner that is unique to the needs of each participant user of the client computing devices 106(1) through 106(N). Each client computing device 106(1) through 106(N) may be associated with a teleconference session view. Examples of the use of teleconference session views to control the views for each participant at the client computing devices are described with reference to FIG. 2.

Figure 2:
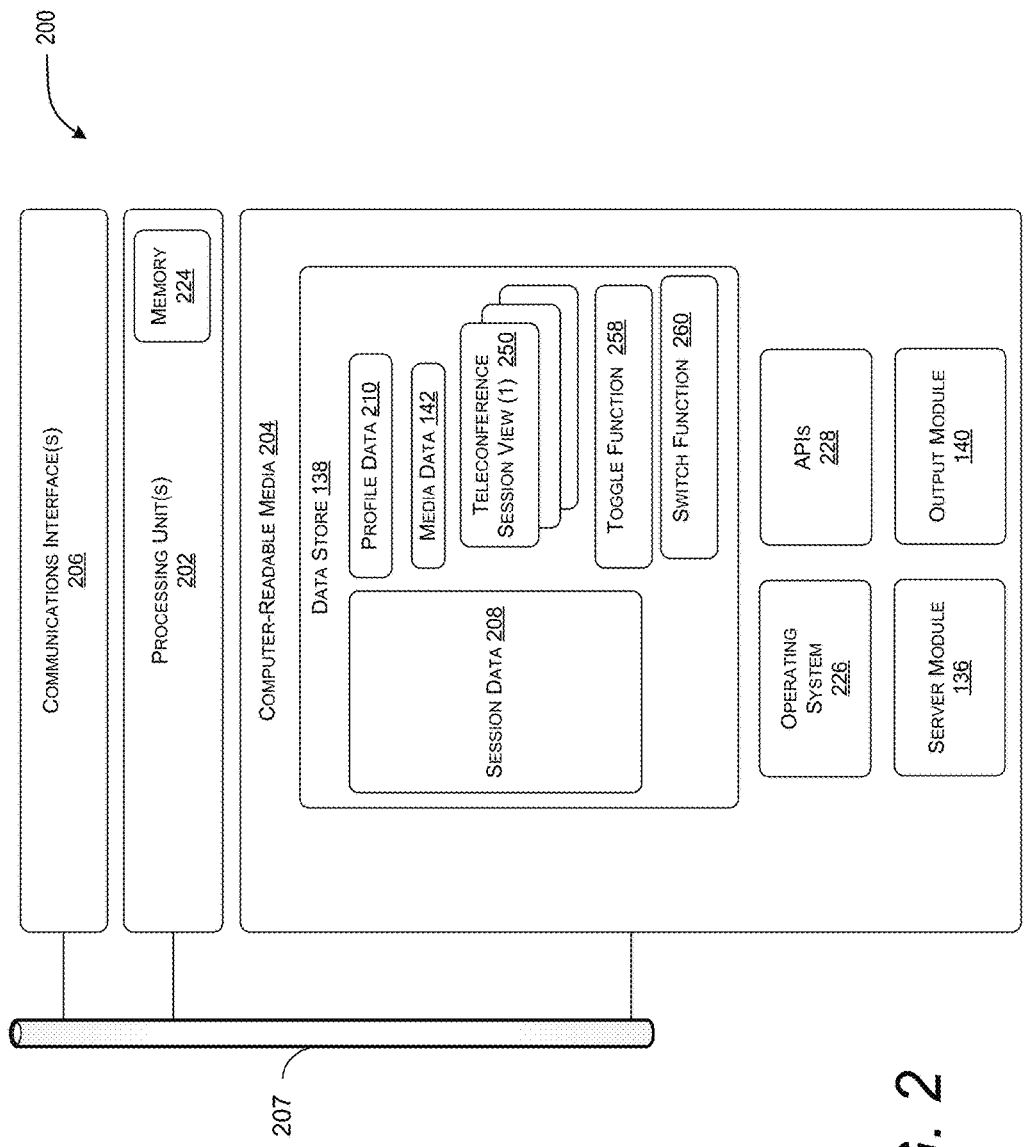
FIG. 2 is a block diagram of an example of the device in the teleconference system of FIG. 1.

In FIG. 2, a system block diagram is shown illustrating components of an example device 200 configured to provide the teleconference session 104 between the client computing devices, such as client computing devices 106(1) through 106(N) in accordance with an example implementation. The device 200 may represent one of device(s) 110 where the device 200 includes one or more processing unit(s) 202, computer-readable media 204, communication interface(s) 206. The components of the device 200 are operatively connected, for example, via a bus 207, which may include one or more of a system bus, a data bus, an address bus, a PCI bus, a Mini-PCI bus, and any variety of local, peripheral, and/or independent buses.

As utilized herein, processing unit(s), such as the processing unit(s) 202 and/or processing unit(s) 112, may represent, for example, a CPU-type processing unit, a GPU-type processing unit, a field-programmable gate array ("FPGA"), another class of digital signal processor ("DSP"), or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 204 and/or computer-readable media 114, may store instructions executable by the processing unit(s). The computer-readable media may also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media may include computer storage media and/or communication media. Computer storage media may include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 206 may represent, for example, network interface controllers ("NICs") or other types of transceiver devices to send and receive communications over a network.

In the illustrated example, computer-readable media 204 includes the data store 138. In some examples, data store 138 includes data storage such as a database, data warehouse, or other type of structured or unstructured data storage. In some examples, data store 138 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 138 may store data for the operations of processes, applications, components, and/or modules stored in computer-readable media 204 and/or executed by processing unit(s) 202 and/or accelerator(s). For instance, in some examples, data store 138 may store session data 208 (e.g., session data 144), profile data 210, and/or other data. The session data 208 may include a total number of participants in the teleconference session 104, and activity that occurs in the teleconference session 104 (e.g., behavior, activity of the participants), and/or other data related to when and how the teleconference session 104 is conducted or hosted. Examples of profile data 210 include, but are not limited to, a participant identity ("ID") and other data.

In an example implementation, the data store 138 stores data related to the view each participant experiences on the display of the participants' client computing devices 106. As shown in FIG. 2, the data store 138 may include a teleconference session view 250(1) through 250(N) corresponding to the display of each client computing device 106(1) through 106(N) participating in the teleconference session 104. In this manner, the system 102 may support individual control over the view each user experiences during the teleconferenced session 104. For example, as described in more detail below with reference to FIGS. 3B and 3C, the system 102 permits a user to participate with an overlay view or a persistent view displayed on the user's client computing device. 106. Overlay views feature the display of desired media on a stage that may cover substantially an entire display screen. Controls, user interface elements, such as icons, buttons, menus, etc., and other elements not directly relevant to the presentation provided by the teleconference session on the display simply do not appear. A persistent view provides a stage, or primary section, that covers a dominant area of the display and one or more marginal, or secondary, sections that display other aspects of the teleconference session.

Persistent and overlay views provide the user with options for how the user may experience the teleconference session. The view on a user's display may be changed under user control to emphasize different aspects of a teleconference session based on the interest of the user. A user may wish to view content, such as a document, or presentation, more closely than the media being communicated from the users. Each user may focus, or promote the content over the participants by having the content displayed in the primary section. Conversely, a user may wish to engage more closely with participants by promoting the media transmitted by the participants to the primary section of the display.

The user may also wish to change the experience of the teleconference session 104 by switching between the overlay and the persistent views. Other views may also be available to further expand the options for experiencing the teleconference to each user. For example, the user may have a distinct role in the teleconference, such as that of a presenter. As such, the presenter may lead the teleconference and provide content to share with the other users. In one view, referred to below as a floating monitor view, the presenter may share his or her desktop with the other users to view as content in a persistent view. The presenter's floating monitor view may include a monitor provided as a user interface element associated with the presenter's media data overlaid on the presenter's desktop. The presenter may move the presenter user interface element to different parts of the display. In example implementations, the presenter user interface would not be visible to the other participants.

The data store 138 may store data relating to other views available during a teleconference session. Some teleconference sessions may involve a large number of participants. However, only a core number of the participants may be what can be referred to as "active participants." The teleconference session view for each user may be configured to focus on media provided by the most active participants. Some teleconference sessions may involve a presenter, such as in a seminar, or a presentation by one or more individuals. At any given time, one participant may be a presenter, and the presenter may occupy an enhanced role in a teleconference session. The presenter's role may be enhanced by maintaining a consistent presence on the user's display.

The system 102 may also support multi-tasking by participants in a teleconference session, by allowing, for example, a user to use other applications during the teleconference session. A teleconference session may display user interface elements that launch other applications that may be used in parallel with the teleconference session. The use of other applications may be supported in the view displayed to each user.

During a teleconference session, a participant may wish to switch to different views of the session at any given time to emphasize or promote either content or people in the user's view. The user can toggle on a user interface element representing the people or content the user wants to promote. The toggle is communicated to the server 136 in a control signal 156. The server 136 may modify a teleconference session view 250 accordingly.

As noted above, the data store 138 may store the profile data 210, media data 142, teleconference session views 250, session data 208, toggle function 258, and switch function 260. Alternately, some or all the above-referenced data can be stored on separate memories 224 on board one or more processing unit(s) 202 such as a memory on board a CPU-type processor, a GPU-type processor, an FPGA-type accelerator, a DSP-type accelerator, and/or another accelerator. In this example, the computer-readable media 204 also includes operating system 226 and application programming interface(s) 228 configured to expose the functionality and the data of the device(s) 110 (e.g., example device 200) to external devices associated with the client computing devices 106(1) through 106(N). Additionally, the computer-readable media 204 includes one or more modules such as the server module 136 and an output module 140, although the number of illustrated modules is just an example, and the number may vary higher or lower. That is, functionality described herein in association with the illustrated modules may be performed by a fewer number of modules or a larger number of modules on one device or spread across multiple devices.

As such and as described earlier, in general, the system 102 is configured to host the teleconference session 104 with the plurality of client computing devices 106(1) through 106(N). The system 102 includes one or more processing units 202 and a computer-readable medium 204 having encoded thereon computer-executable instructions to cause the one or more processing units 202 to receive media data 142(1) through 142(M) at the system 102 from a plurality of client computing devices 106(1) through 106(N), select portions of the media data 142 based, at least in part, on the teleconference session view 250 for each user, and communicate a teleconference stream 146 according to the teleconference session views 250 corresponding to the client computing devices 106(1) through 106(N). The teleconference streams 146(1) through 146(N) are communicated from the system 102 to the plurality of client computing devices 106(1) through 106(N). The teleconference session views 250(1) through 250(N) cause the plurality of client computing devices 106(1) through 106(N) to display views of the teleconference session 104 under user control. The computer-executable instructions also cause the one or more processing units 202 to determine that the teleconference session 104 is to transition to a different teleconference session view of the teleconference session 104 based on a user communicated control signal 156. The media data 142 is also communicated from the system 102 to the plurality of client computing devices 106(1) through 106(N).

In some implementations, the techniques disclosed herein may utilize one or more predetermined interface arrangements, also referred to as "views," or "teleconference session views." In an example of operation, the system 102 performs a method that includes receiving the media data 142(1) through 142(N) at the system 102 from a plurality of client computing devices 106(1) through 106(N), combining and formatting the media data 142 based, at least in part, on a selected teleconference session view for each client computing device to form a teleconference stream 146(1) through 146(N), and transmitting a teleconference stream 146(1) through 146(N) to each client computing device.

As will be described below, the predetermined interface arrangements of the teleconference session views can include a primary section (referred to herein as a "canvas" or "stage") and a secondary section (referred to herein as a portion of the display that displays "thumbnails"). In some implementations, the secondary section can individually be configured as a region comprising selectable user interface elements for selecting streams of media data associated with the individual sections. The predetermined interface arrangements can also include graphical elements providing control functionality ("control elements") for a teleconferencing session. For instance, a graphical element may be generated on the user interface enabling a user to provide content, end a session, mute one or more sounds, etc.

In one illustrative example, the techniques disclosed below can utilize an overlay view. The overlay view may comprise one or more control elements. In some configurations, the control elements can be displayed to the user for a predetermined period of time and then fade after the predetermined period of time has lapsed. In response to certain types of user activity, such as hovering a pointing device over a predetermined area of the user interface, the control elements may reappear for a predetermined period of time.

The overlay view can include the presentation of people or content in a primary section and the presentation of people or content in a secondary section. The secondary section, which includes the user interface elements, may be displayed for a predetermined period of time overlaid on the primary section in a user-ON state, and then fade after the predetermined period of time has lapsed.

A given user interface element in the secondary section can be selected by a user to "pin" a particular display of content or a person to the user interface. The user interface element for the content or user for which the "pin" element is selected does not fade over time, but rather remains displayed in the secondary section overlaid on the primary section.

In another illustrative example, the techniques disclosed herein can utilize a persistent view. The persistent view can provide one or more control elements, which can be configured as described above. In general, the persistent view is designed to provide an optimized interface for sharing content. The persistent view can include the presentation of people or content in a primary section in the presentation of people or, either content or people in the secondary section. In the persistent view, the presentation of the people or content in the secondary section does not fade after a predetermined period of time.

Figure 3:
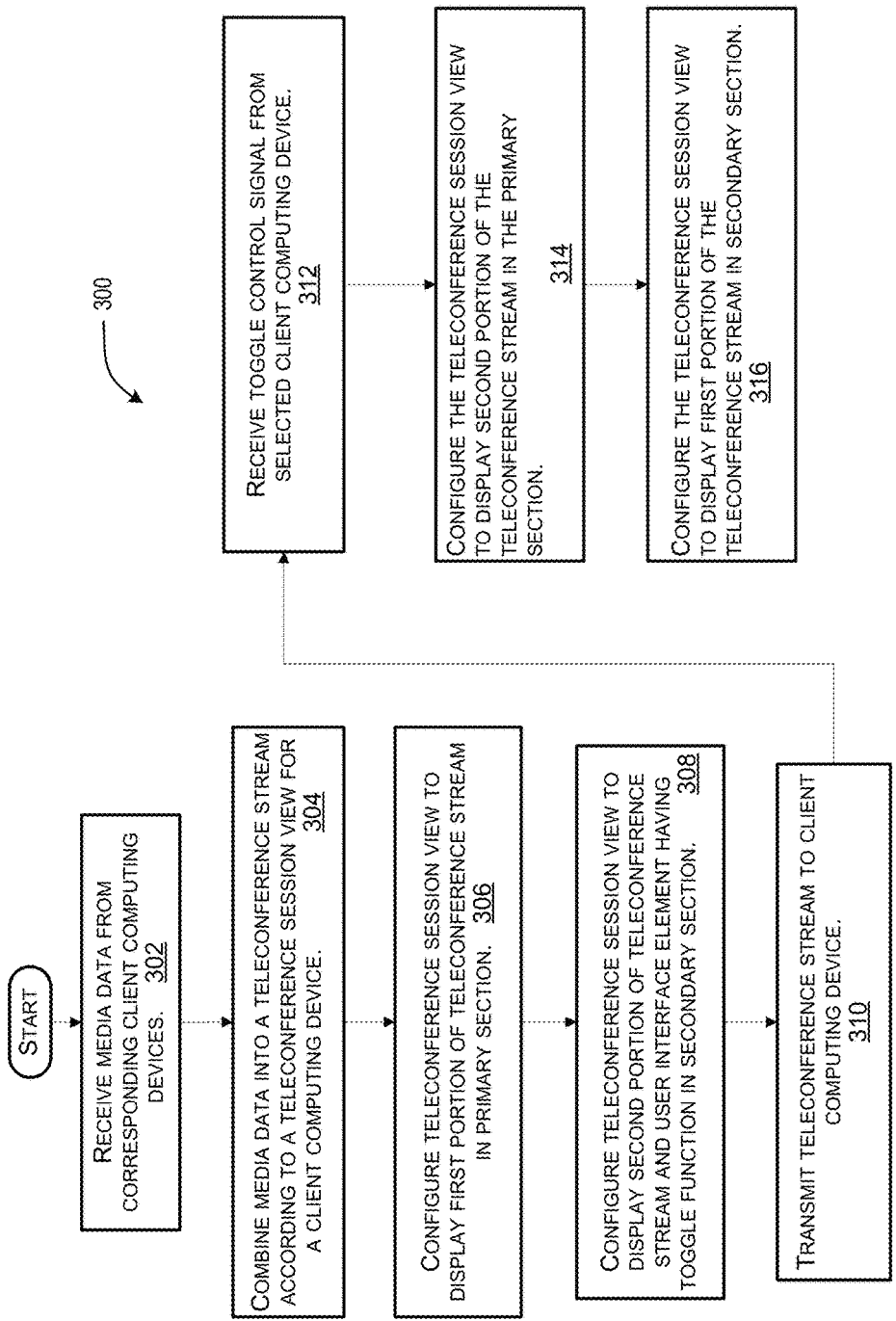
FIG. 3 is a flowchart illustrating operation of a toggle view function in the example teleconference system of FIG. 1.

Turning now to FIG. 3, aspects of a routine 300 for toggling the display in a selected teleconference session view on a client computing device are shown and described. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 300 are described herein as being implemented, at least in part, by an application, component and/or circuit, such as the server module 136 in device 110 in FIG. 1 in the system 100 hosting the teleconference session 104. In some configurations, the server module 136 can be a dynamically linked library (DLL), a statically linked library, functionality produced by an application programing interface (API), a compiled program, an interpreted program, a script or any other executable set of instructions. Data and/or modules, such as the server module 136, can be stored in a data structure in one or more memory components. Data can be retrieved from the data structure by addressing links or references to the data structure.

Although the following illustration refers to the components of FIG. 1 and FIG. 2, it can be appreciated that the operations of the routine 300 may also be implemented in many other ways. For example, the routine 300 may be implemented, at least in part, by a processor of another remote computer or a local circuit, such as for example, the client module 130 in device 110. In addition, one or more of the operations of the routine 300 may alternatively or additionally be implemented, at least in part, by a chipset working alone or in conjunction with other software modules. Any service, circuit or application suitable for providing the techniques disclosed herein can be used in operations described herein.

Referring to FIG. 3, the routine 300 begins at 302, where the server 136 receives a plurality of media data 142(1)-142(N) from corresponding client computing devices 106(1)-106(N). Users of each client computing device communicate a request to join the teleconferencing session 104 and communicate a media stream 142 once authorized to participate in the teleconferencing session 104. The server module 136 receives the media data 142 from each client computing device 106.

Figure 4A:
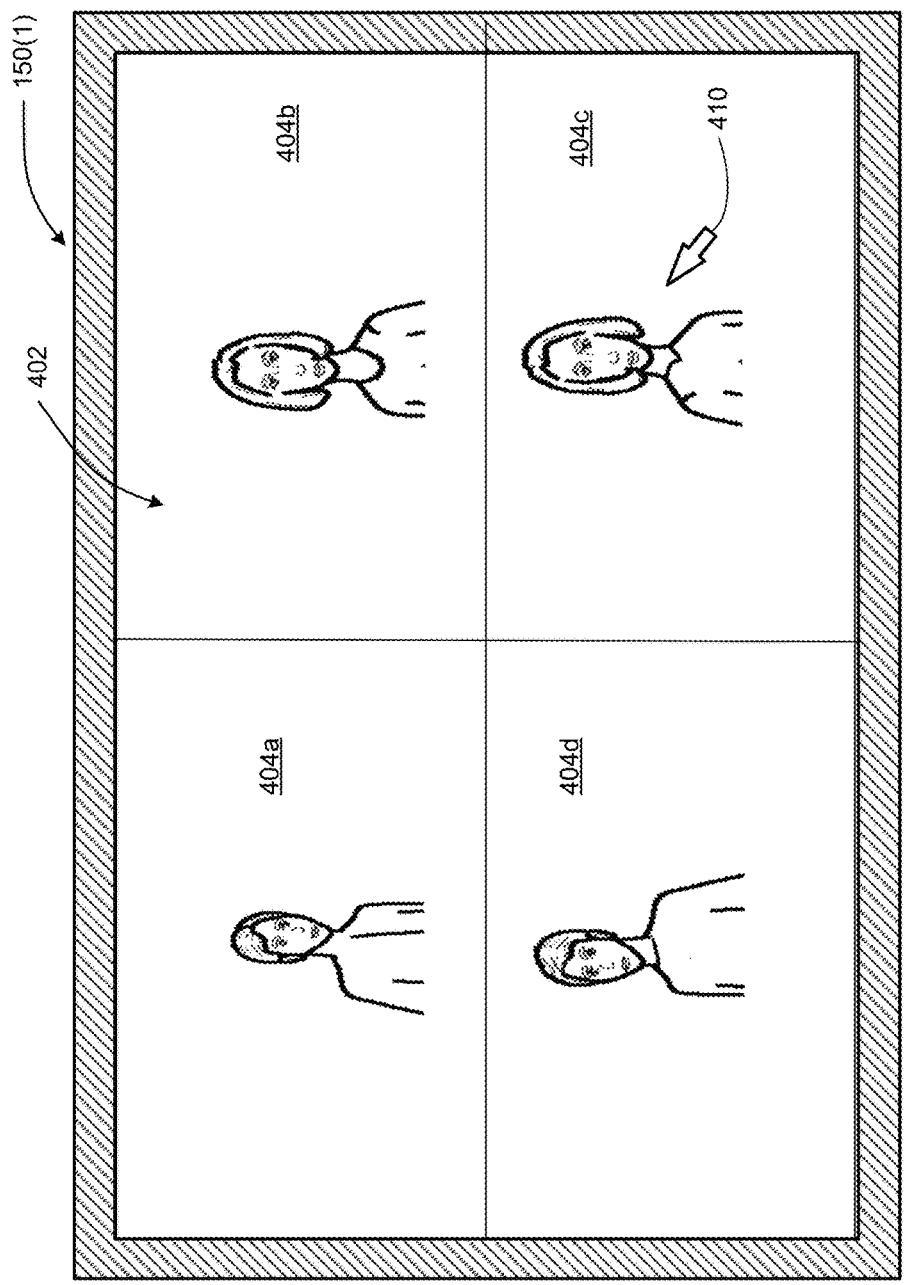
FIGS. 4A-4F are screenshot views of a display corresponding to one of the client computing devices in the teleconference session illustrating operation of the toggle view function in an overlay view.
Figure 4B:
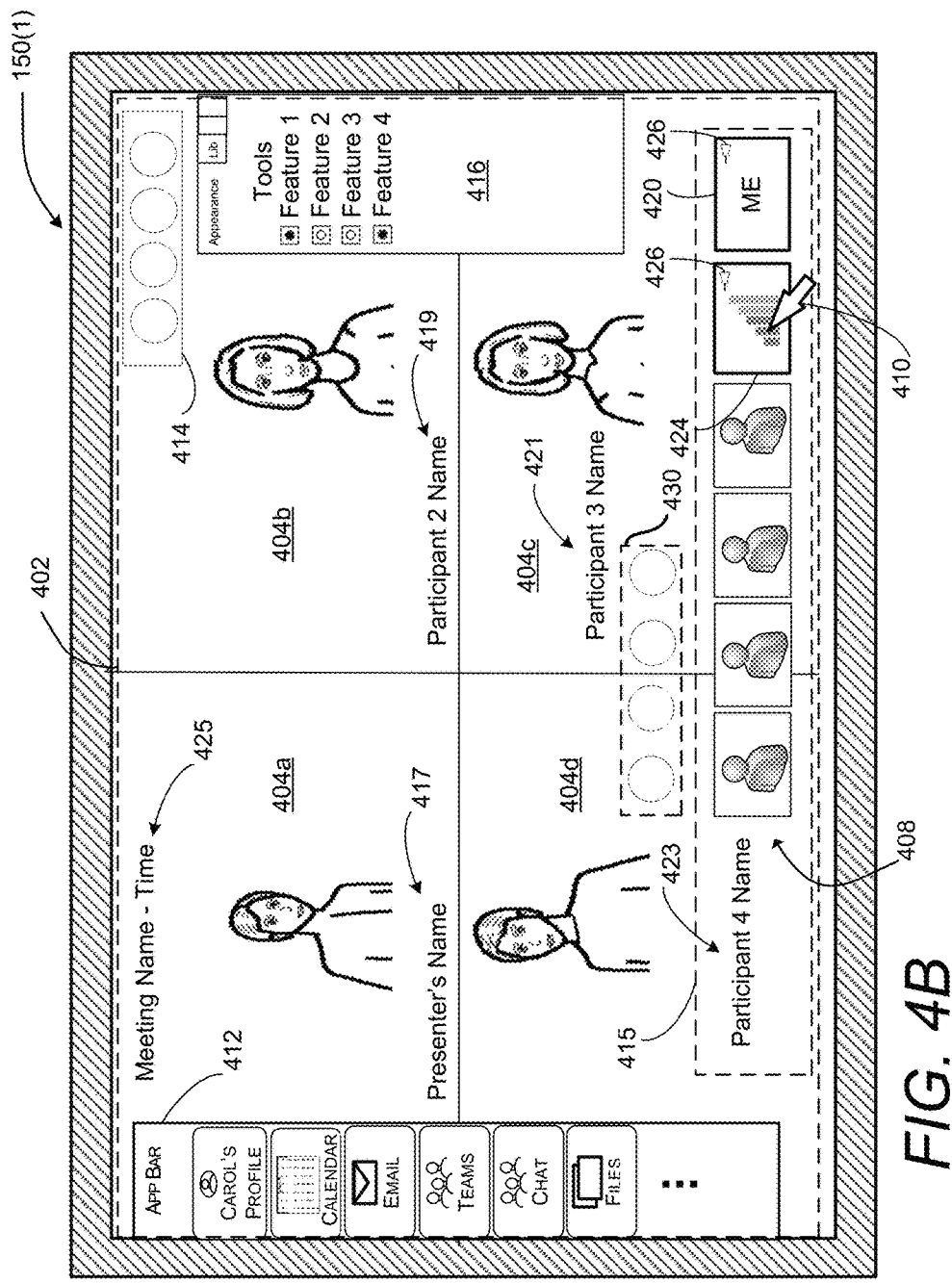
Figure 4C:
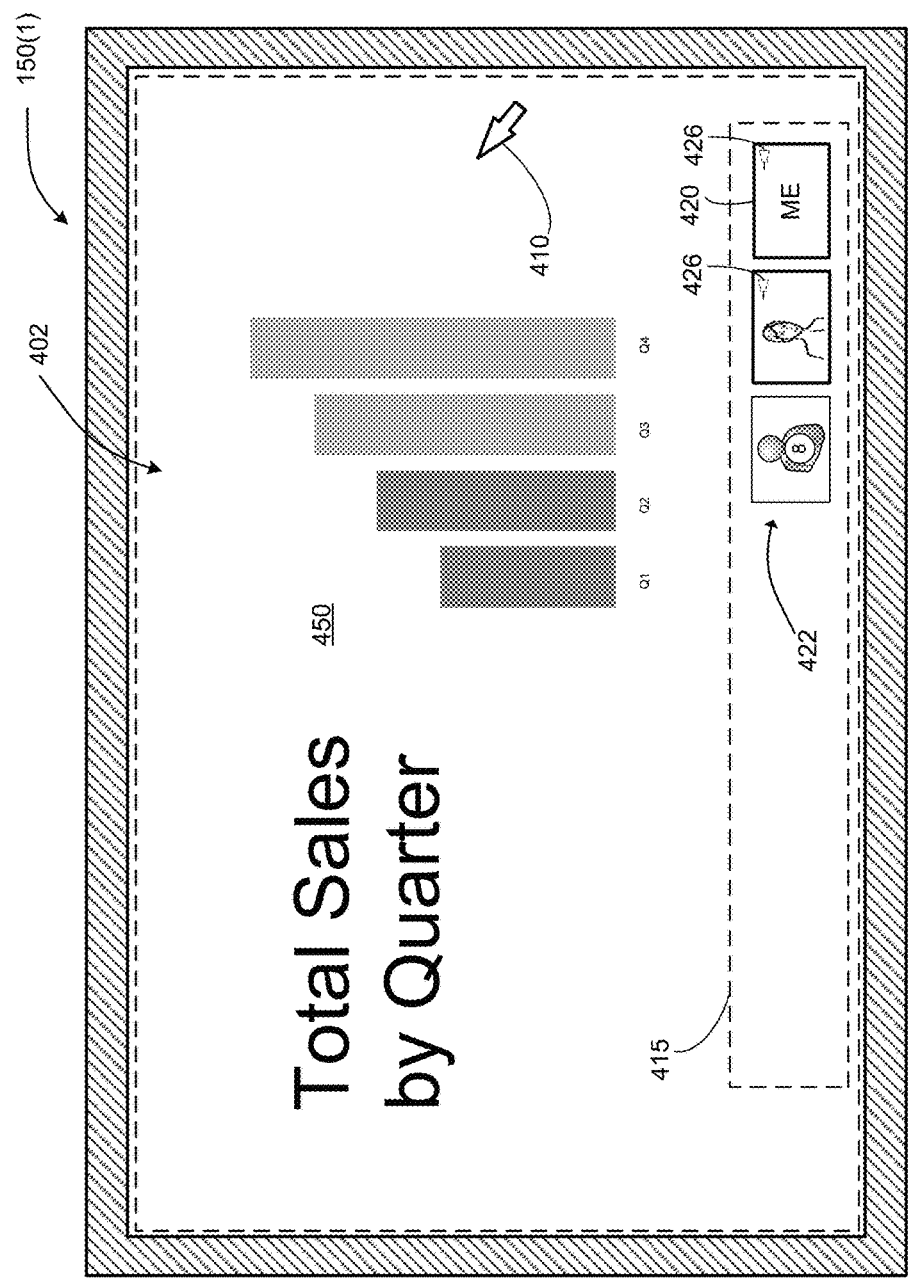

At step 304 portions of the media data are combined into a teleconference stream 146 according to a selected teleconference session view 250(1) corresponding to a selected client computing device 106(1) having a display device 150(1). In an example implementation, the teleconference session view may be an overlay view or a persistent view as described below with reference to FIGS. 5 and 7, respectively. At step 306, the teleconference session view 250(1) is configured to display a first portion of the teleconference stream in a primary section of the display 150(1). One example of a first portion of the teleconference stream can include a display of shared content, as shown in FIG. 4C and FIG. 6A. Other examples of a first portion can also include a display of people or groups of people.

At step 308, the teleconference session view 250(1) is configured to display a second portion of the teleconference stream in a secondary section. The secondary section may include a user interface element for displaying the second portion of the teleconference stream. The user interface element may include a toggle function for sending a toggle control signal to the server when the user interface element is selected. In some configurations, the secondary section can include a rendering of at least one portion of a plurality of portions of the teleconference stream 146, wherein the selection is based on an activity level priority associated with the at least one portion. For instance, in the overlay view, a dominant participant or dominant content can be displayed in the secondary section. An example of such a display is described herein and shown in FIG. 4C. The secondary section can display a stream of a participant, a representation of a participant, a group of participants, and/or content.

In some configurations, the secondary section can include a rendering of a plurality of portions of the teleconference stream 146. For instance, in the persistent view, any predetermined number of participants or content can be displayed and arranged in the secondary section, wherein the selection of the participants or content can be based on an activity level priority associated with each participants or content. In addition, the order of the participants or content can be based on an activity level priority associated with individual portions of the teleconference stream 146 containing participants or content. An example of such a display is described herein and shown in FIG. 6A. Although this example shows four portions of the teleconference stream 146, the secondary section can display any number of portions that are selected and arranged based on the associated activity level priorities.

In configuring the teleconference session view, portions of a teleconference stream, which can include portions of media data, may be arranged in a session view based on an activity level priority for each media data presented by each participant. The video or shared content in the media data for each participant may be analyzed to determine an activity level priority for any portion of a teleconference stream. The activity level priority, which is also referred to herein as a "priority value," can be based on any type of activity including, but not limited to, any of the following:

1. participant motion—the extent to which a participant moves in the video may determine the participant's activity level. Participants in the process of gesturing or otherwise moving in the video may be deemed to be participating at a relatively high level in the teleconference.
2. participant lip motion—the video may be analyzed to determine the extent to which a participant's lips move as an indication of the extent to which the participant is speaking Participants speaking at a relatively high level may be deemed to be participating at a corresponding relatively high level.
3. participant facial expressions—the participant's video may be analyzed to determine changes in facial expressions, or to determine specific facial expressions using pattern recognition. Participants reacting through facial expressions in the teleconference may be deemed to be participating at a relatively high level.
4. content modification—video of content being shared in the teleconference may be analyzed to determine if it is being modified. The user interface element corresponding to content may be promoted in rank in the secondary section or automatically promoted to the primary section if the video indicates the content is being modified.
5. content page turning—video of content being shared may be analyzed to determine if there is page turning of a document, for example, and assigned a corresponding activity level priority.
6. number of participants having content in the primary section—video of content being shared may be assigned an activity level priority based on the number of participants that have a view of the content in the primary section or secondary section.
7. participant entering teleconference session—media data from participants entering a teleconference may be assigned a high activity level priority. A priority value can be based on the order in which participants join a session.
8. participant leaving teleconference session—media data from participants entering a teleconference may be assigned a low activity level priority.

At step 310, the teleconference stream is transmitted to the selected client computing device 106(1) to display the teleconference stream according to the teleconference session view 250(1). Once displayed, the user may participate in the teleconference session 104 in the view formatted according to the teleconference session view 250(1). The user may modify the view on the display to change the user's experience of the teleconference session. The user may initiate one method for modifying the view by selecting the user interface element in the secondary section, which invokes the toggle function causing the client computing device 106(1) to transmit a toggle control signal (e.g. control signal 156(1) in FIG. 1) to the server.

At step 312, the toggle control function is received from the client computing device 106(1). In some configurations, the toggle control can be based on an input from a user selection of a graphical element. In some configurations, the toggle control can be based on a signal or data generated by a computing device detecting one or more conditions.

Figure 4D:
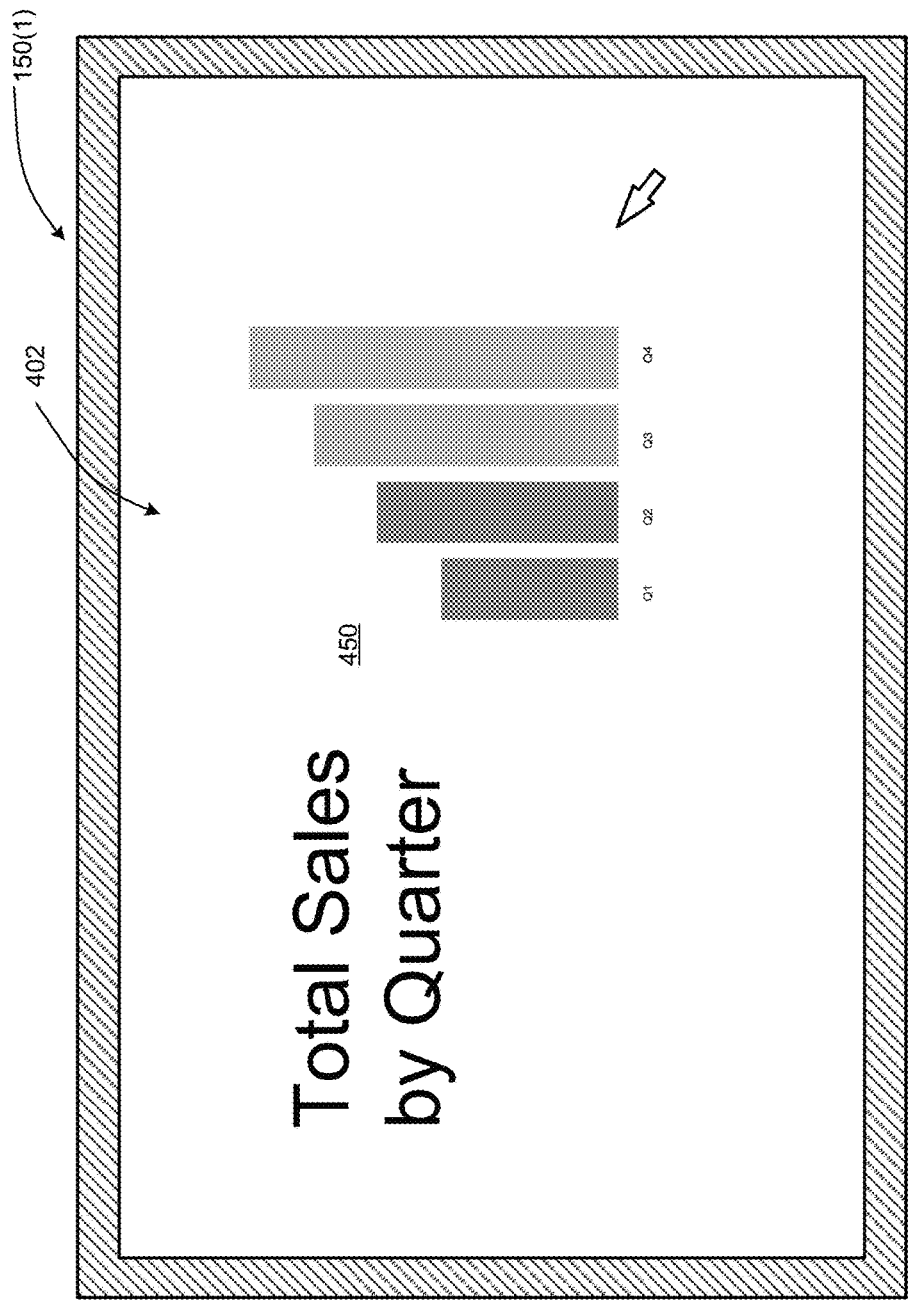
Figure 6A:
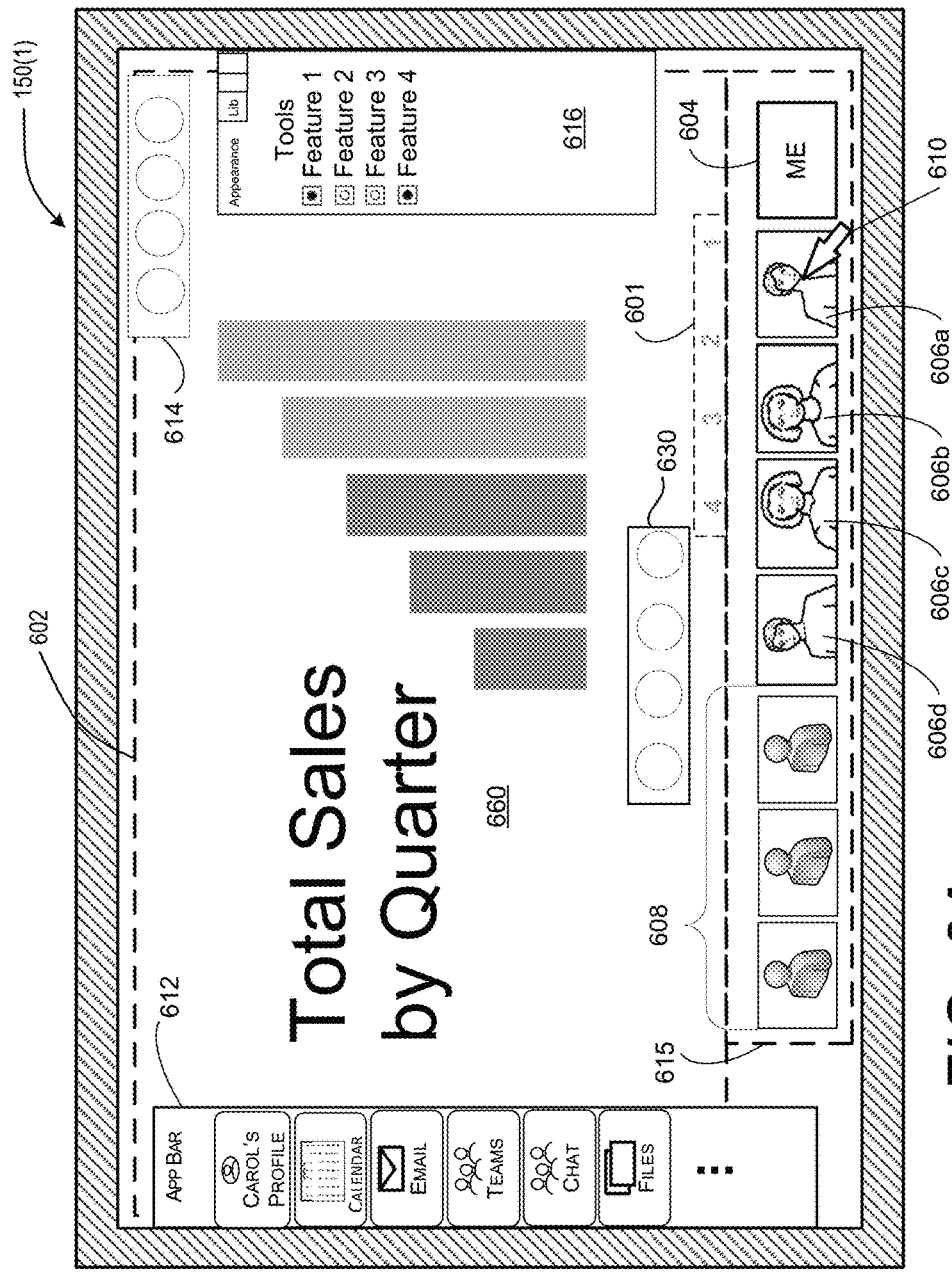
FIGS. 6A-6D are screenshot views of a display corresponding to one of the client computing devices in the teleconference session illustrating operation of the toggle view function in a persistent view.
Figure 6B:
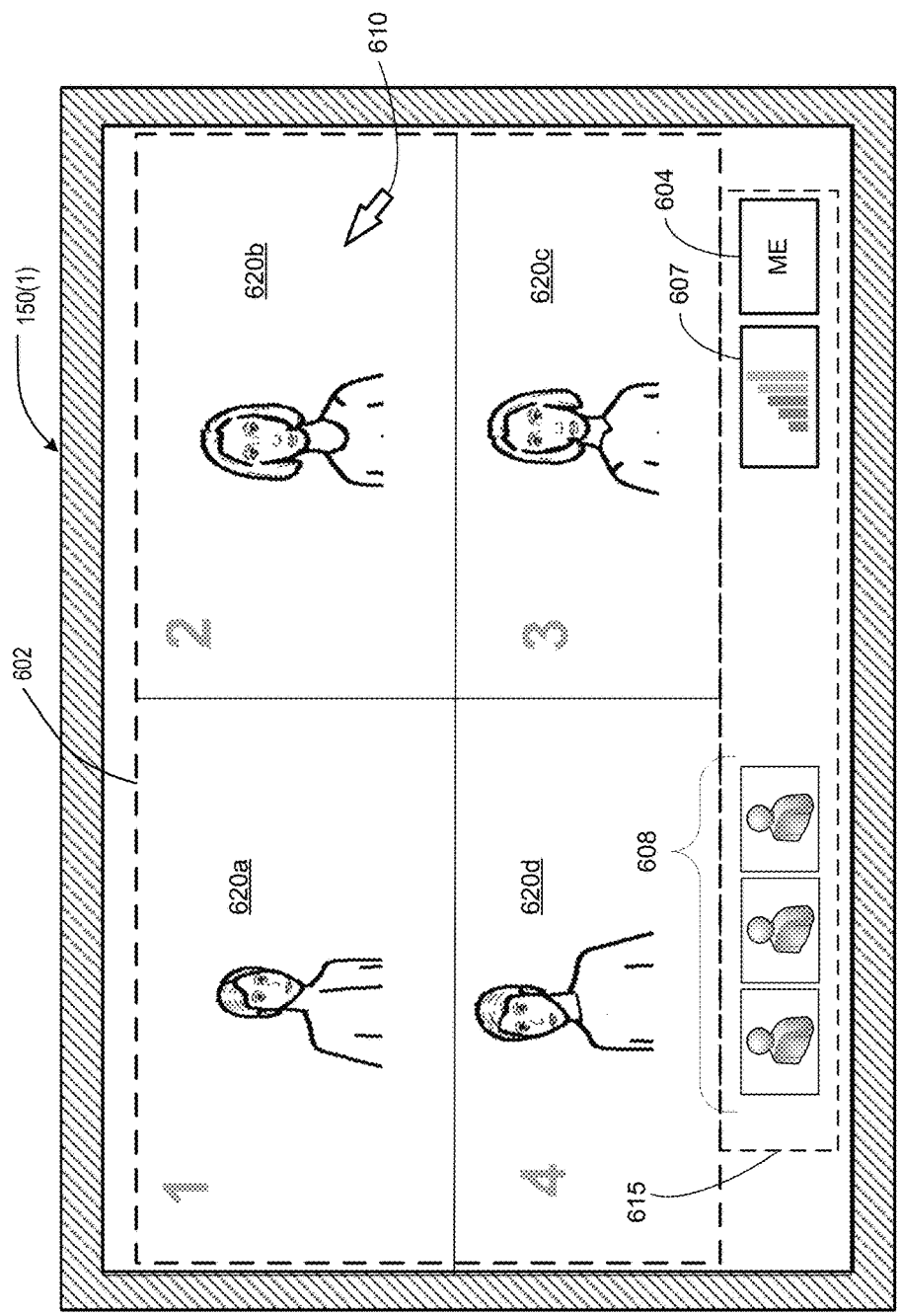

At step 314, the teleconference session view is changed responsive to the toggle control signal. The teleconference session view is changed to display the second portion of the teleconference stream in the primary section. In some configurations, a rendering of the plurality of portions of the teleconference stream 146 can be displayed in the primary section. In such configurations, the individual portions of the plurality of portions are arranged according to at least one activity level priority associated the individual portions. The plurality of portions can include any number of portions depending on a number of participants or the number of portions containing shared content. An example of such a display is described herein and shown in FIG. 6C. In such an example, the individual portions of the plurality of portions are arranged according to at least one activity level priority associated the individual portions. At step 316, the teleconference session view is changed to display the first portion of the teleconference stream in the secondary section. With reference to the above example referencing FIG. 4C and FIG. 6A, after the toggle, the first portion that includes shared content can now be displayed in the secondary section, as shown in FIG. 4F and FIG. 6B.

It is noted that the media data 142(1)-142(N) in FIG. 1 may include user media data corresponding to audio or video signals communicated by the client computing devices 106(1)-106(N) used by the participants of the teleconference session 104. The media data may also include content media data corresponding to an audio or video presentation to be shared with the participants in the teleconference session 104. In an example implementation, the first portion of the teleconference stream 146(1)-146(N) communicated to a selected client computing device, for example, the selected client computing device 106(1) in FIG. 1 may include one or more media data communicated by the other client computing devices 106(2)-106(N). The second portion of the teleconference stream 146(1)-146(N) may include content media. In the description of example implementations below, the second client computing device 106(2) is described as communicating the content media data as media data 146(2). It is noted that any of the client computing devices 106 may communicate either user media data, content media data, or both content and user media data during the teleconference session.

In the example described above, the first portion of the teleconference stream includes audio or video from users or participants of the teleconference session. The video or audio in the first portion of the teleconference stream may be rendered in the primary section by the client computing device 106(1) according to the teleconference session view. The second portion including audio or video corresponding to shared content may be rendered in the user interface element in the secondary section. The user may select the user interface element to toggle the views so that the content audio or video is rendered in the primary section and the user audio or video is rendered in the secondary section. If the first portion of the teleconference stream includes audio or video from more than one user, individual user interface elements may be displayed in the secondary section to render the audio or video from each user. The user interface element or elements in the secondary section corresponding to the user media data may also have a toggle function. If selected, the toggle function may again be invoked to switch the user media data in the secondary section with the content media data in the primary section.

In another example implementation, the first portion may correspond to the audio or video in the content media data and the second portion of the teleconference stream may correspond to the user media data. An individual user interface element may be associated with each of one or more users having media data represented in the second portion of the teleconference stream. Selection of any one of the user interface elements may invoke the toggle function to switch the user media data corresponding to the user interface elements to display in the primary section, and the content media in the primary section to display in the secondary section.

The ability for users to toggle between a content emphasis and a people emphasis in various views is described with reference to screenshots of the displays as the toggling function is performed. Specifically, reference is made to FIGS. 4A-4F, which illustrate example display views in the process of changing as the teleconference session views are toggled. FIGS. 4G-4L are also referenced in the description below to provide an example of toggling views on a client computing device that is a mobile computing device, such as for example, a phone or a tablet computer.

In an overlay view, the secondary section is not displayed unless the view transitions to a user-ON state in which the user is permitted to select a user interface element in the secondary section. FIG. 4A depicts an example of a display 150(1), which is shown connected to interface 134 of client 106(1) in FIG. 1, displaying an overlay view of the teleconference session 104 in accordance with an example implementation. The overlay view of display 150(1) includes a primary section 402 extending across the area of the display 150(1). In some configurations, the primary section 402 is configured in a manner that dominates the display. In some configurations, the primary section 402 can be substantially from edge-to-edge. As summarized above, the overlay view can optionally include a secondary section based on one or more conditions. In some configurations, the primary section 402 can be larger than the secondary section. The example of FIG. 4A illustrates one example of the overlay view that does not include a secondary section. A pointer 410 is provided to permit the user to interact with the view. The primary section 402 is divided into four graphic elements 404a-d each corresponding to a user media data. The user media data includes audio, audio and video, or audio and an image communicated from a client computing device belonging to a user participating in the teleconference session.

Four graphic elements 404a-404d are shown occupying the primary section 402 in the example shown in FIG. 4A; however, any number of graphic elements may be displayed. In some examples, the number of displayed graphic elements may be limited to a maximum by available bandwidth or by a desire to limit video clutter on the display 150(1). Fewer than four graphic elements 404a-404d may be displayed when fewer than four participants are involved in the teleconference session. In teleconference sessions involving more than the maximum number of graphic elements, the graphic elements 404a-d displayed may correspond to the dominant or those deemed to be "active participants." The designation of "active participants" may be pre-defined as a reference to specific people, or as in some implementations, a function may be provided to identify "active participants" versus passive participants by applying an activity level priority.

The activity level priority ranks participants based on their likely contribution to the teleconference. In an example implementation, an activity level priority for identifying active versus passive participants may be determined at the server 136 by analyzing the media data of each participant. The teleconference system may include a function that compares the activity of participants and dynamically promotes those who speak more frequently or those that move and/or speak more frequently to be the active participants.

The placement of the graphic elements 404a-404d may also reflect the activity level priority of the participants to which the graphic elements correspond. For example, an overlay view may be defined as having a convention in which the top left corner of the primary section 402 displays the graphic element 404a corresponding to the most dominant participant. In some sessions, the dominant participant may be a presenter. The top right corner of the primary section 402 may display the graphic element 404b corresponding to the second ranked participant. The lower right hand corner of the primary section 402 may display the graphic element 404c corresponding to the third ranked participant. The lower left hand corner of the primary section 402 may display the graphic element 404d corresponding to the lowest ranked participant. In some sessions, the top right corner may display the graphic element 404a corresponding to a presenter, and the other three positions on the primary section 402 may dynamically switch to more active participants at various times during the session.

In an example implementation, the transition to the user-ON state may be triggered when the user moves the input device controlling the pointer 410 on display 150(1) in FIG. 4A. FIG. 4B depicts the transition to the user-ON state in which a secondary section 415 encompasses a "ME" user interface element 420 and a content user interface element 424. In the overlay view, the secondary section 415 is overlaid on the primary section 402. The display change due to the transition to the user-ON state may be limited to an appearance time after which the secondary section 415 overlaying the primary section 402 would disappear so that the display 150(1) would revert to the overlay view as shown in FIG. 4A.

FIG. 4B shows the "ME" user interface element 420 having an image, an avatar, or a video of the user of the client computing device 106(1) on which the teleconference session is playing. FIG. 4B also shows the content user interface element 424 having an image, an avatar, or a video representing content to be shared. In some implementations, the image or video may be configured to display the content media data within the secondary section 415. The "ME" user interface element 420 and/or the content user interface element 424 may be displayed as a miniaturized 16:9 video or image screen. The 16:9 screen may be playing video while in the secondary section 415 in the user-ON state. The secondary section 415 may also include one or more passive participant user interface elements 408 associated with media data communicated by participants that may be categorized as being passive participants as opposed to active participants. Each passive participant user interface element 408 may include a pin 426 as in the content user interface element 422 and in the "ME" user interface element 420 to pin the passive participant user interface element 408 to the display. For teleconferencing sessions that include more than a predetermined number of active and passive participants to indicate in the teleconference session display, the passive participants may be ranked according to the activity level priority described above. The most active participants are displayed in the primary section 402 and a selected number of user interface elements corresponding to the next most active participants may be displayed as passive participants 408 in the secondary section 415. In another example implementation, the passive participants may be indicated by a single icon or avatar containing a number of total participants in the teleconferencing session as described below with reference to FIG. 4C.

The user-ON state may also cause other user interface controls to appear on the display 150(1) in addition to the secondary section 415. For example, the display 150(1) may include an applications bar 412, a view control bar 414, and a tools bar 416. The applications bar 412 may include control elements for selecting one or more applications during the teleconference session. For example, a user may wish to start a chat session with another user or group of users in parallel with the teleconference session. The user may wish to bring up a calendar or check on any alerts that may have popped up during the teleconference session. The view control bar 414 may include control elements, such as buttons or switches, that may be used to change the teleconference session view. For example, the user may wish to switch to the persistent view, or to a multi-tasking view in which the applications bar 412 remains on the display 150(1) along with a display for any application in use. The tools bar 416 may include tools for controlling the visual aspects of the display or other aspects of the session.

While the display 150(1) is in the user-ON state, the user graphic elements 404a-d may include images or text that identifies aspects of the teleconference. For example, a dominant participant's name 417 may be displayed in the first user graphic element 404a. A second participant's name 419 may be displayed in the second user graphic element 404b. A third participant's name 423 may be displayed in the third graphic element 404c. A fourth participant's name 423 may be displayed in the fourth graphic element 404d. The display 150(1) may also include a meeting identifier 425, which may include text indicating a name for the teleconference to provide some context on the display. The meeting identifier 425 may also include a time of day, or a timer indicating the time elapsed during the meeting. The meeting identifier 425, the dominant participant's name 417, the second participant's name 419, the third participant's name 421, and the fourth participant's name 423 may all be displayed for a user-ON time and then disappear. The time for display of the images or text relating to these aspects of the teleconference may be the same as the time for displaying the secondary section 415, or different in different implementations.

The user-ON state may also cause a set of core controls 430 to appear as shown in dashed lines in FIG. 4B. In the illustrated example, the view on the display 150(1) includes the set of core controls 430, which can be configured to control aspects of the teleconference session 104. For instance, a first button of the core controls 430 can disconnect the device 106(1) from the teleconferencing session 104. A second button of the core controls 430 can control the microphone of the device 106(1), i.e., a mute button. A third button of the core controls 430 can control the camera of the device 106(1), i.e., toggle the camera on or off. A fourth button of the core controls 430 can be used to add users to the session 104. In response to receiving the user actuation of the fourth button, a menu can be displayed enabling users to select other users to become meeting participants.

These examples of core controls 430 are provided for illustrative purposes and are not to be construed as limiting. It can be appreciated that the core controls 430 can involve any suitable functionality related to the teleconferencing session 104. For instance, one or more buttons of the core controls 430 can change limits on the bandwidth related to the video data streams, display properties, etc. In some configurations, the display of the core controls 430 can fade over a predetermined time period similar to the other controls that fade after a time period described above. In such configurations, the core controls 430 can be redisplayed based on one or more actions, such as a hover or another suitable user gesture within a predetermined portion of the user interface. The core controls 430 shown in FIG. 4B are represented in dashed lines to illustrate that the core controls 430 may not be displayed in a user-OFF state, or after a predetermined period of time. In some configurations, the core controls 430 may remain visible in the primary section 402 of the display, or in another portion of the display as required.

In an example implementation, the appearance time for the secondary section 415 may be different from the appearance time for the applications bar 412, the view control bar 414, and the tools bar 416. In one example, the appearance time for the secondary section 415 may run from the moment the pointer 410 stops on the display 150(1) while the appearance time for the applications bar 412, view control bar 414, and tools bar 416 may be the time during which the pointer 410 is in motion. The applications bar 412, view control bar 414, and tools bar 416 would then disappear once the pointer 410 stops moving on the display 150(1). In another example, the secondary section 415 may be timed to remain visible longer than the applications bar 412, view control bar 414, and tools bar 416. In another example, the applications bar 412, view control bar 414, and tools bar 416 may appear upon the motion of the pointer 410 and time out after the pointer stops, while the secondary section 415 may appear only when the pointer 410 hovers over the area on which the secondary section 415 are positioned. In another example, the user interface elements in the secondary section 415 may include a pin 426 (e.g. as shown on the content user interface element 424 in FIG. 4B). The user may select the pin 426 to keep the content user interface element 424 visible after the user-ON state times out. The other user interface elements 420 and 424 may disappear after the user-ON state times out. The content user interface element 424 would remain visible in the secondary section 415 over the primary section 402.

FIG. 4C is an example if the display 150(1) in the overlay view after a user has toggled the view to display a content graphic element 450. The content graphic element 450 is displayed over the area of the display 150(1) in accordance with an example implementation of the overlay view. The secondary section 415 may remain overlaid on the primary section 402 for a predetermined period of time. While overlaid on the primary section 402, the secondary section 415 may include the "ME" user interface element 420 and a participant user interface element 422. The participant user interface element 422 may correspond to, and render video for, the dominant participant or dominant content in the teleconferencing session. The participant user interface element 422 may alternatively be a single icon or avatar having a number indicating the number of participants in the teleconferencing session. The secondary section may also include the single participant user interface element 422, or the most active participant user interface elements as shown in FIG. 4B.

In the user-OFF state, the secondary section disappears. FIG. 4D depicts the display 150(1) showing the content graphic element 450 in overlay view in the user-OFF state.

Figure 4E:
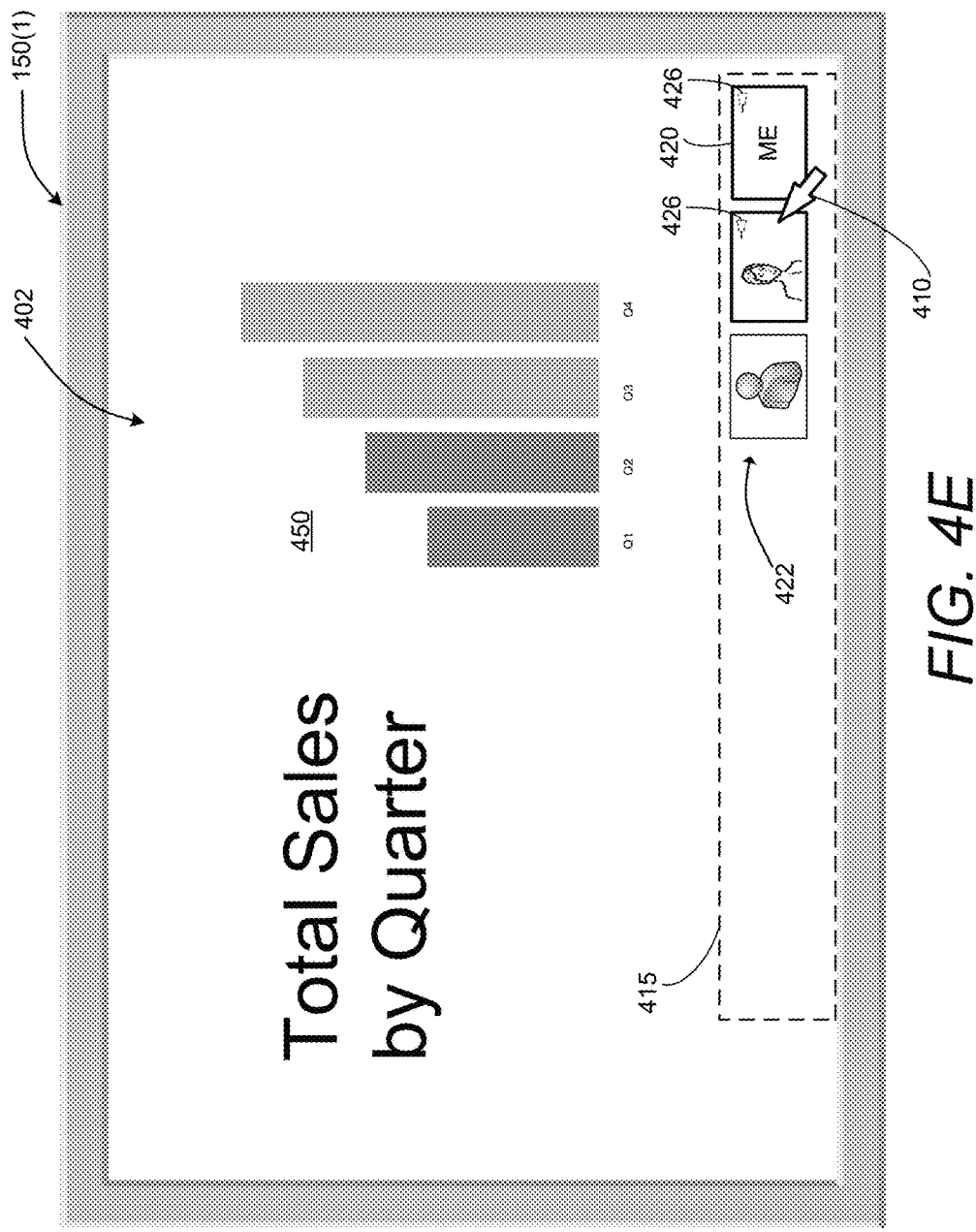
Figure 4F:
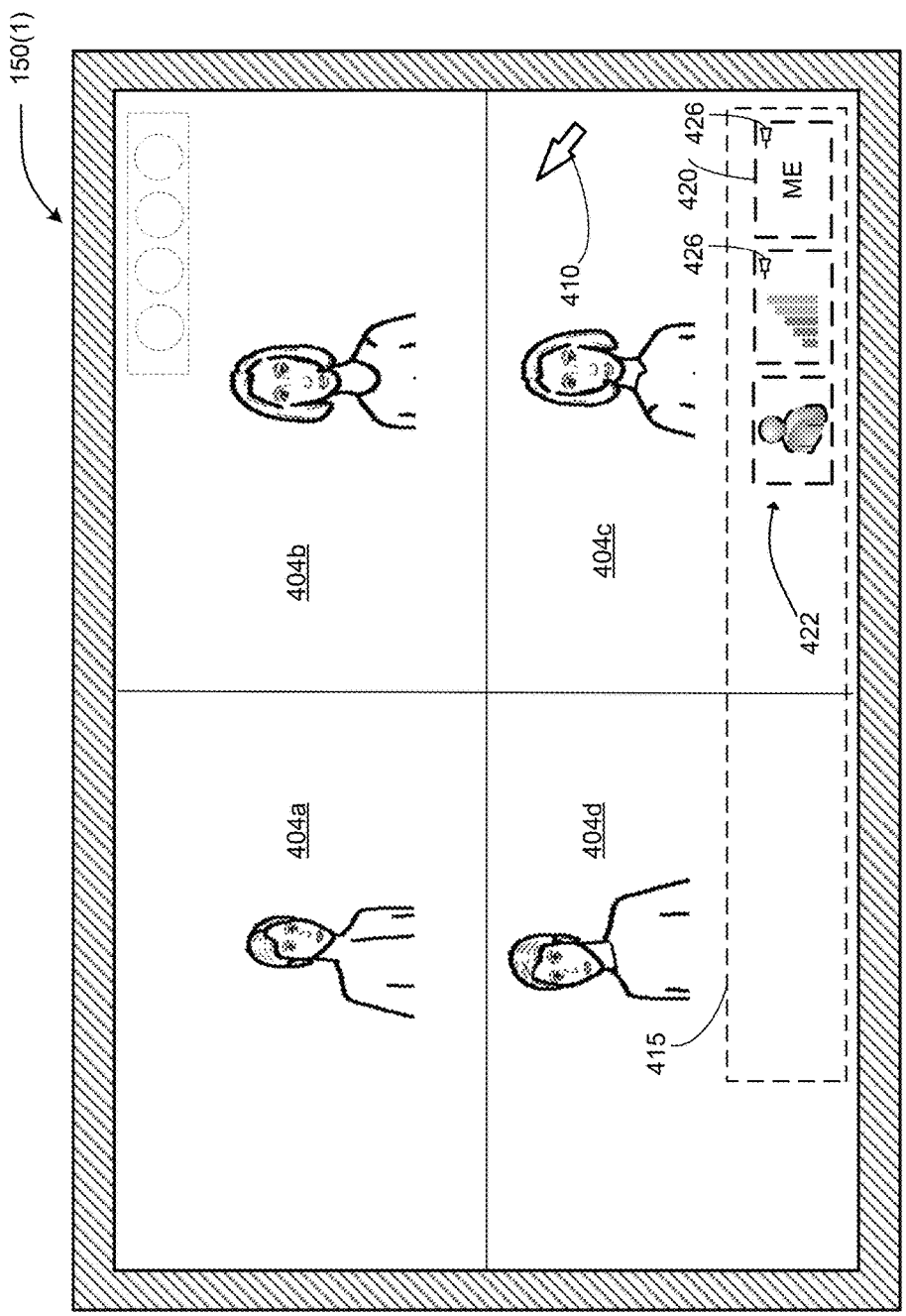

FIG. 4E depicts the secondary section 415 overlaid on the primary section 402, which displays the content graphic element 450 when the display 150(1) is in the user-ON state. FIG. 4E further shows the pointer element 410 hovering over the dominant participant user interface element 422 indicating a user selection of the dominant participant user interface element 422. Although this example involves an activation of the user-ON state based on a hovering action, the systems disclosed herein can activate a user-ON state based on any suitable input from a user or computer, an input which may involve a voice command, a swipe gesture on a touch display, or any other suitable form of input. The secondary section 415 is indicated in dashed lines to indicate the secondary section 415 disappears after a time as described above with reference to FIG. 4B. If the user selects the dominant participant user interface element 422, the display 150(1) is toggled to display the active participant graphic elements 404a-d in the primary section 402 and to display the content user interface element 424 in the secondary section 415 for display in the user-ON state as shown in FIG. 4F. The secondary section 415 and the user interface elements 420 and 424 shown in the secondary section 415 are depicted in dashed lines to indicate they are overlaid over the primary section 402 during a predetermined time. After the time elapses, the display 150(1) transitions to the user-OFF state and the secondary section 415 disappears. The display 150(1) is left in the overlay view with the active participant graphic elements 404a-d displayed, and the display in the user-OFF state as shown in FIG. 4A.

It is noted that the secondary section 415 is overlaid on the primary section 402 in a lower portion of the display 150(1) in FIGS. 4B, 4C, 4E and 4F. The placement of the secondary section 415 in these examples is selected for purposes of describing example implementations. The secondary section 415 may be placed anywhere on the display 150(1) that is suitable for a given application. In the overlay view, the secondary section 415 is overlaid on the primary section 402 in the user-ON state, or when user interface elements in the secondary section 415 are pinned to the display 150(1).

Figure 4H:
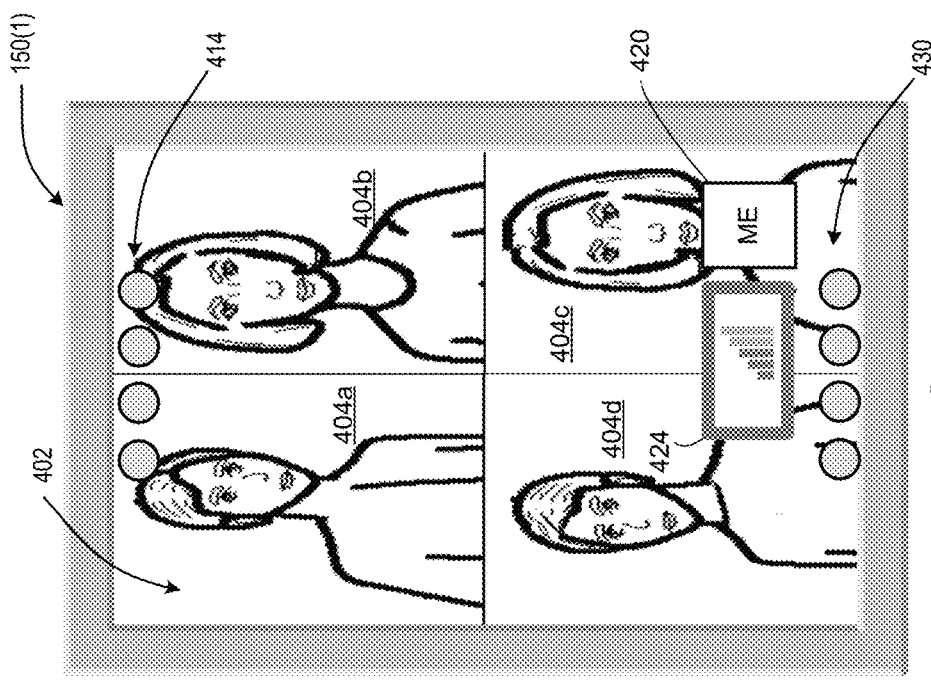
Figure 4G:
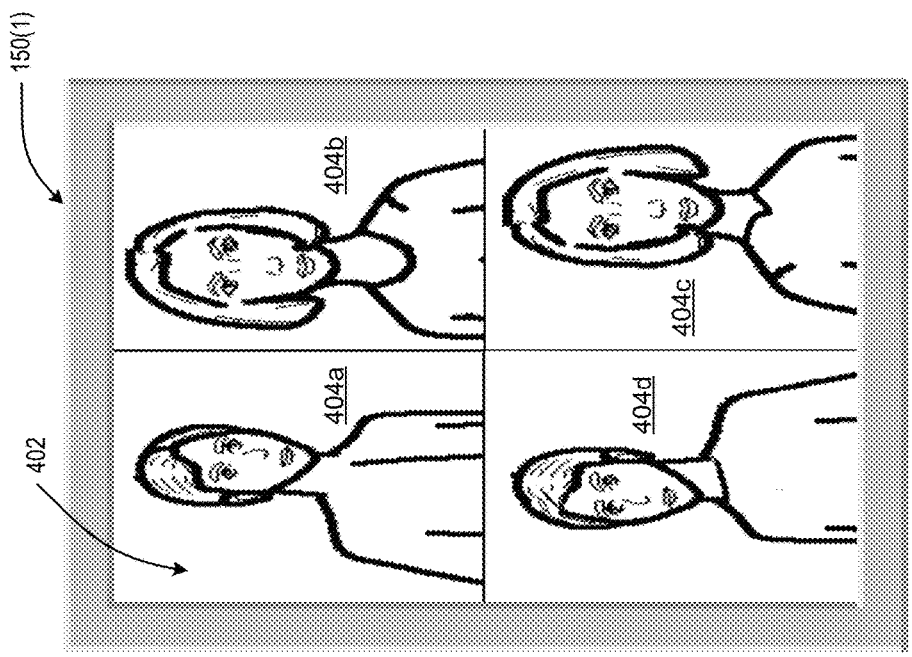

FIG. 4G shows the display 150(1) of a client computing device 106(1) implementation as a mobile device, such as for example, a mobile phone. It is noted that elements common to the display 150(1) depicted in examples of the larger display on a laptop or desktop as shown in FIGS. 4A-4G are described using the same reference numbers.

The display 150(1) in FIG. 4G is a screenshot showing a view with a primary section 402 that depicts active participant graphic elements 404a-d similar to the view on the display 150(1) in FIG. 4A, only on a smaller screen. The smaller mobile device may be transitioned to a user-ON state similar to that of the display 150(1) in FIG. 4A. The transition to the user-ON state may be performed by, for example, tapping on the display 150(1), pressing the display 150(1) for a minimum period of time, swiping the display 150(1), or pressing a physical button elsewhere on the device. FIG. 4H shows the display 150(1) in the user-ON state, in which the view includes the "ME" user interface element 420 and the content user interface element 424 placed generally in a portion of the display 150(1) that can be denoted as a secondary section.

The content user interface element 424 includes control functions that are performed when the user interface element is selected. In the example illustrated in FIGS. 4G and 4H, a toggle function is performed when the user selects the content user interface element 424. With the overlay view showing the media data from the participants of the teleconference session displayed in the primary section 402, the user may wish to display the content being shared in the teleconference by invoking the toggle view function.

The display 150(1) in FIG. 4H includes a view control bar 414 that includes a set of view switch controls and a set of core controls 430. The view control bar 414 may be implemented as buttons, or a user interface element that may be selected to change the display 150(1) to another view. For example, one of the view control bar 414 may be used to switch the display 150(1) from the overlay view depicted in FIG. 4H to a persistent view described below with reference to FIGS. 6E-6H. The view control bar 414 may also enable switching to other views that may be defined in an example implementation. The core controls 430 provide call control functions and call configuration functions that may be used during the teleconference session. The core controls 430 shown in FIG. 4H are similar to the core controls 430 described above with reference to FIG. 4B.

FIG. 4H shows the display 150(1) on the mobile client computing device in the user-ON state as described above. The content user interface element 424 is highlighted in grey with a wide grey outline to indicate it has been selected by a user. The selection of the content user interface element 424 toggles views. A control signal may be sent to the server controlling the teleconference session. The server changes the teleconference session view and changes the teleconference stream that is communicated to the mobile client computing device to toggle the display as requested.

In the example shown in FIG. 4H, selection of the content user interface element 424 results in the display 150(1) changing as shown in FIG. 4I. The display 150(1) in FIG. 4I is in the overlay view with the content media promoted to display in the primary section 402. The display 150(1) in FIG. 4I is in the user-ON state. In the user-ON state, the user interface elements overlaying the primary section 402 include the "ME" user interface element 420, a dominant participant user interface element 422, and an icon or avatar 427 representing other (e.g. passive) participants in the teleconference session. The icon 427 may be presented as a simple graphic element with or without video, or as a shape indicating a number of participants as shown in the example in FIG. 4I. The user-ON state may time out leaving the display 150(1) in the overlay view, user-OFF state as shown in FIG. 4J.

FIG. 4K shows the display 150(1) in the overlay view in the user-ON state. The user interface elements overlaying the primary section 402 include the "ME" user interface element 420, the dominant participant user interface element 422, and the icon or avatar 427 displaying a number ("5") of passive participants in the teleconference session. The dominant participant user interface element 422 in FIG. 4K is shown with a wide grey border indicating it has been selected. Selection of the dominant participant user interface element 422 changes the display 150(1) to show the overlay view with participant graphic elements 404a-d in the primary section 402. The user interface elements 420, 424, and 427 are shown with dashed lines as borders to indicate that they would not be visible once the display 150(1) transitions to the user-OFF state as shown in FIG. 4G.

Figure 5:
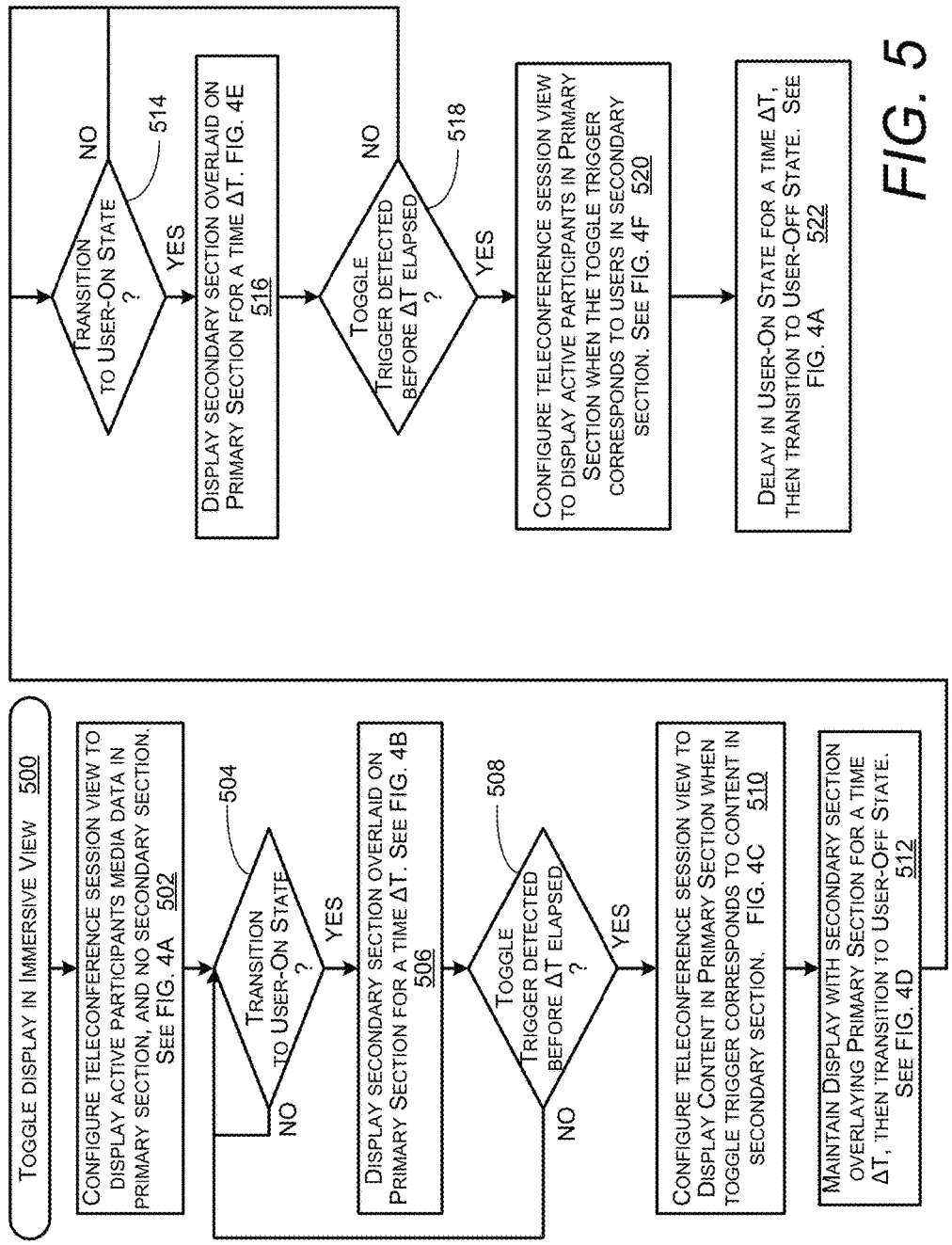
FIG. 5 is a flowchart illustrating operation of a toggle view function with a display in an overlay view.

FIG. 5 is a flowchart illustrating operation of a routine 500 for toggling views when the teleconference session view is in the overlay view. At step 502 in FIG. 5, the display is configured in an overlay view with a display that promotes a view of media received from the session participants. Such a view is illustrated and described above with reference to FIG. 4A. In the overlay view in FIG. 4A, the teleconference session view is configured to display user media data for active participants in the primary section of the display. The overlay view "hides" or omits display of any user interface controls. Routine 500 in FIG. 5 waits for user interaction in the overlay view. For example, the routine 500 may wait for a transition to a user-ON state as indicated by decision block 504. When transition to the user-ON state occurs (the YES condition of decision block 504), the display 150(1) is changed at step 506 to display the secondary section including thumbnails, or user interface elements, overlaid on the primary section. At step 506, the display may show the secondary section overlaid on the primary section for a period of time then transition to a user-OFF state in which the display remains in overlay view and the secondary section disappears.

While the display 150(1) is in the user-ON state, decision block 508 determines if a toggle trigger is detected before the user-ON state times out. If the toggle trigger is detected (YES path of decision block 508), and if the toggle trigger is received from the content user interface element 424 (in FIG. 4B), the teleconference session view is configured at step 510 to display a content graphic element corresponding to the content of the content user interface element in the primary section. Such a view is illustrated in FIG. 4C. At step 512, the display 150(1) is maintained in the user-ON state (secondary section overlaid on the primary section) for a predetermined time. Such a view is illustrated in FIG. 4D.

When the display transitions to the user-OFF state, the routine 500 waits for user interaction at decision block 514. When user interaction is detected, whether by motion of a mouse, a hovering of the pointer element, or by whatever method is used to detect user interaction, the display transitions to the user-ON state (YES path of decision block 514) at step 516. At state 516, the secondary section is overlaid on the primary section providing the user with user interface elements to select for a period of time. If a toggle trigger is detected at decision block 518 before the display transitions to a user-OFF state, and if the toggle trigger corresponds to the active participant user interface element(s) in the secondary section, the teleconference session view is configured to display active participant graphic elements in the primary section at step 520. Such a view is illustrated in FIG. 4F. At step 522, the display is maintained in the user-ON state for a delay time before transitioning to the user-OFF state. An example of the transition to the view in the user-OFF state is illustrated in FIG. 4A.

Figure 6C:
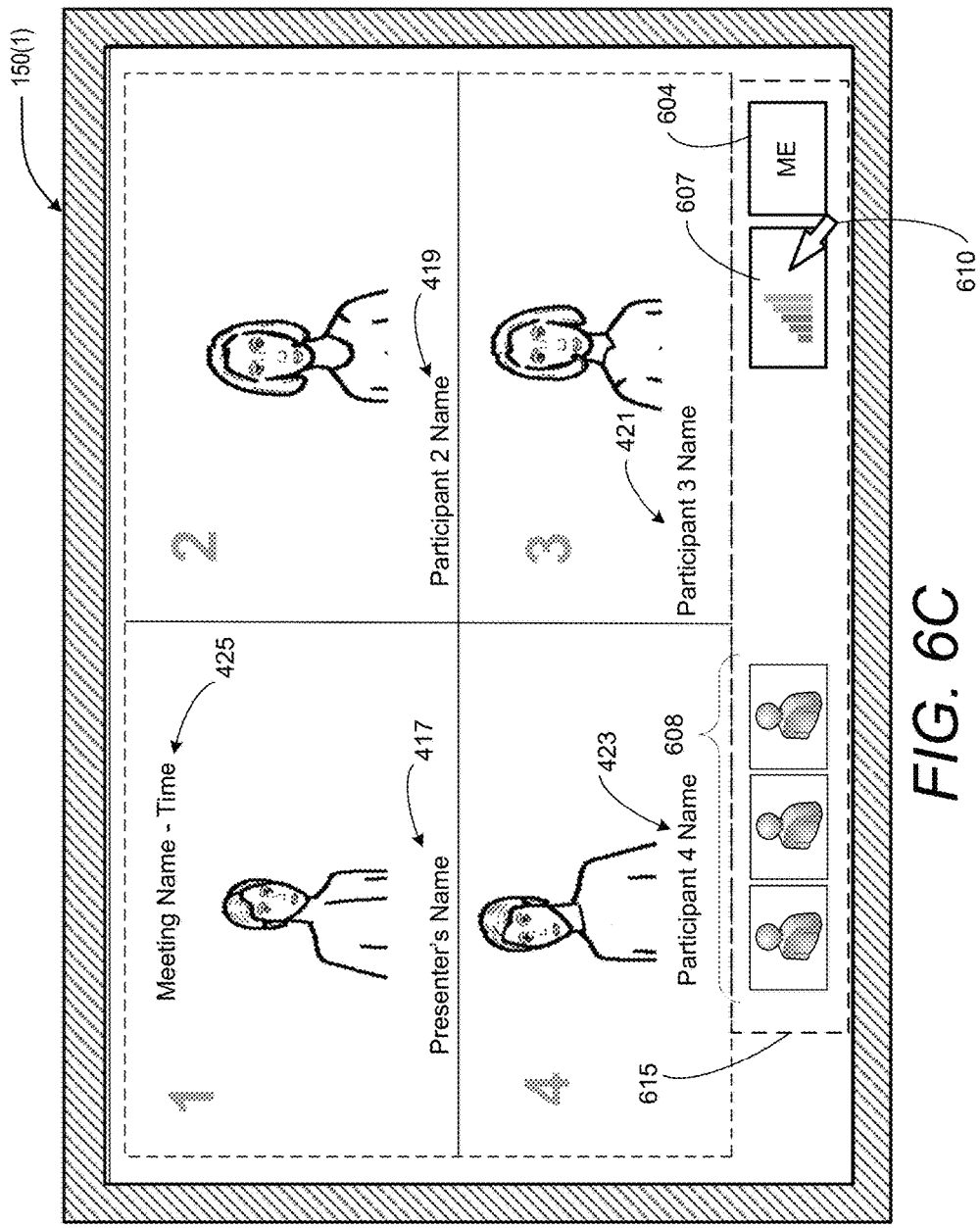

FIGS. 6A-6E illustrate example display views in the process of changing as the teleconference session views are toggled between content and participant in a persistent view. FIGS. 6F-6H are also referenced in the description below to provide an example of toggling views in the persistent view on a client computing device that is a mobile computing device, such as for example, a phone or a tablet computer.

FIG. 6A depicts an example of the display 150(1) in the persistent view in which a content graphic element 660 is displayed in a primary section 602, or stage. The primary section 602 has an area that may be less than the edge-to-edge area of the display 150(1) leaving space to display a secondary section 615 side-by-side with the primary section 602. The secondary section 615 may include user interface elements displayed as thumbnails or icons. More specifically as shown in FIG. 6A, the secondary section 615 includes a "ME" user interface element 604 displayed as an icon or thumbnail, four active participant user interface elements 606a-d displayed as thumbnails, and four passive participant user interface elements at 608 displayed as avatars or icons. The "ME" user interface element 604 may be displayed as a thumbnail operating as a miniaturized video 16:9 monitor configured to play the media data corresponding to the user of the display 150(1). The secondary section 615 is displayed beneath the primary section 602 so as not to overlay the primary section, which is one aspect that distinguishes the persistent view from the overlay view. The secondary section 615 is shown below the primary section 602, but may be positioned anywhere on the display relative to the primary section 602.

The active participant user interface elements 606a-d may be represented as 16:9 video thumbnails that display an image or video corresponding to media data transmitted by the users associated with the active participant user interface elements 606a-d while in the secondary section 615. The active participant user interface elements 606a-d may be ranked, or prioritized as described above with reference to FIG. 4B. The position of the participant user interface elements 606a-d may indicate the rank or priority based on an activity level priority. For example, the first participant user interface element 606a may be a presenter or a dominant participant (e.g. ranked by position, such as leader of an organization) in the teleconference session. The second, third and fourth participant user interface elements 606b, c, and d may be ranked in order from left to right. One example of the ranking of active participants is shown at 601 in grey outlined with dashed lines to indicate that the area at 601 is not part of the display.

The passive participant user interface elements at 608 are shown in FIG. 6A as avatars. The passive participant user interface elements at 608 may or may not have associated media data communicated to the client computing device. In an example implementation, the system may monitor and compare the activity of the users associated with the active and passive user interface elements 606a-d, 608. The system may determine an activity level priority for each participant and include user interface elements with media data from participants having the highest activity level priority. The activity level priority may be used to promote or demote participants thereby providing a dynamic presentation of participants in the secondary section. More active participants represented with passive user interface elements at 608 may be moved to correspond with an active participant user interface element 606. Similarly, active participants that become quieter than one or more passive participants may be moved to correspond with a passive participant user interface element at 608. Unlike the overlay view, the secondary section 615 in the persistent view does not disappear, but rather remains visible during the session.

The display in persistent view may include an applications bar 612, a view control bar 614, a tools bar 616, and core controls 630, which may appear and time out when the pointer is moved. The applications bar 612, the view control bar 614, tools bar 616, and core controls 630 are described above with reference to FIG. 4B.

FIG. 6A shows the pointer 610 over the first active participant user interface element 606a. The user's selection of the first active participant user interface element 606a toggles the display to the persistent view of the display 150(1) in FIG. 6B. Toggling the participant user interface elements changes the display so that graphic elements 620a-d associated with the four active participants previously represented as active participant user interface elements 606a-d are displayed in the primary section 602. The graphic elements 620a-d may be placed according to their priority or ranking as described with reference to FIG. 4A. The grey numbers 1-4 indicate the correlation between the position of the graphic elements 620a-d and the position of the active participant user interface elements 606a-d. The grey numbers may not be part of the display, although the numbers may appear for a period of time and disappear.

FIG. 6B shows the active participant user interface elements 606a-d removed from the persistent view and a content user interface element 607 positioned in the secondary section 615. FIG. 6C shows the persistent view of FIG. 6B with the pointer 610 hovering over the content user interface element 607. The movement of the pointer 610 may place the display 150(1) in a user=ON state similar to the user-ON state described above with reference to FIGS. 4A-4E. In the persistent view however, the controls made available in the user-ON state would not include the user interface controls in the secondary section 615 as the secondary section 615 remains visible in the persistent view. In the persistent view, the user-ON state may provide display of images or text that identifies aspects of the teleconference. For example, such images or text may include the meeting identifier 425, the dominant participant's name 417, the second participant's name 419, the third participant's name 421, and the fourth participant's name 423 described above with reference to FIG. 4B. It is noted that the meeting identifier 425, the dominant participant's name 417, the second participant's name 419, the third participant's name 421, and the fourth participant's name 423 described with reference to FIG. 4B or with reference to FIG. 6C may remain visible regardless of the user-ON or user-OFF states.

Figure 6D:
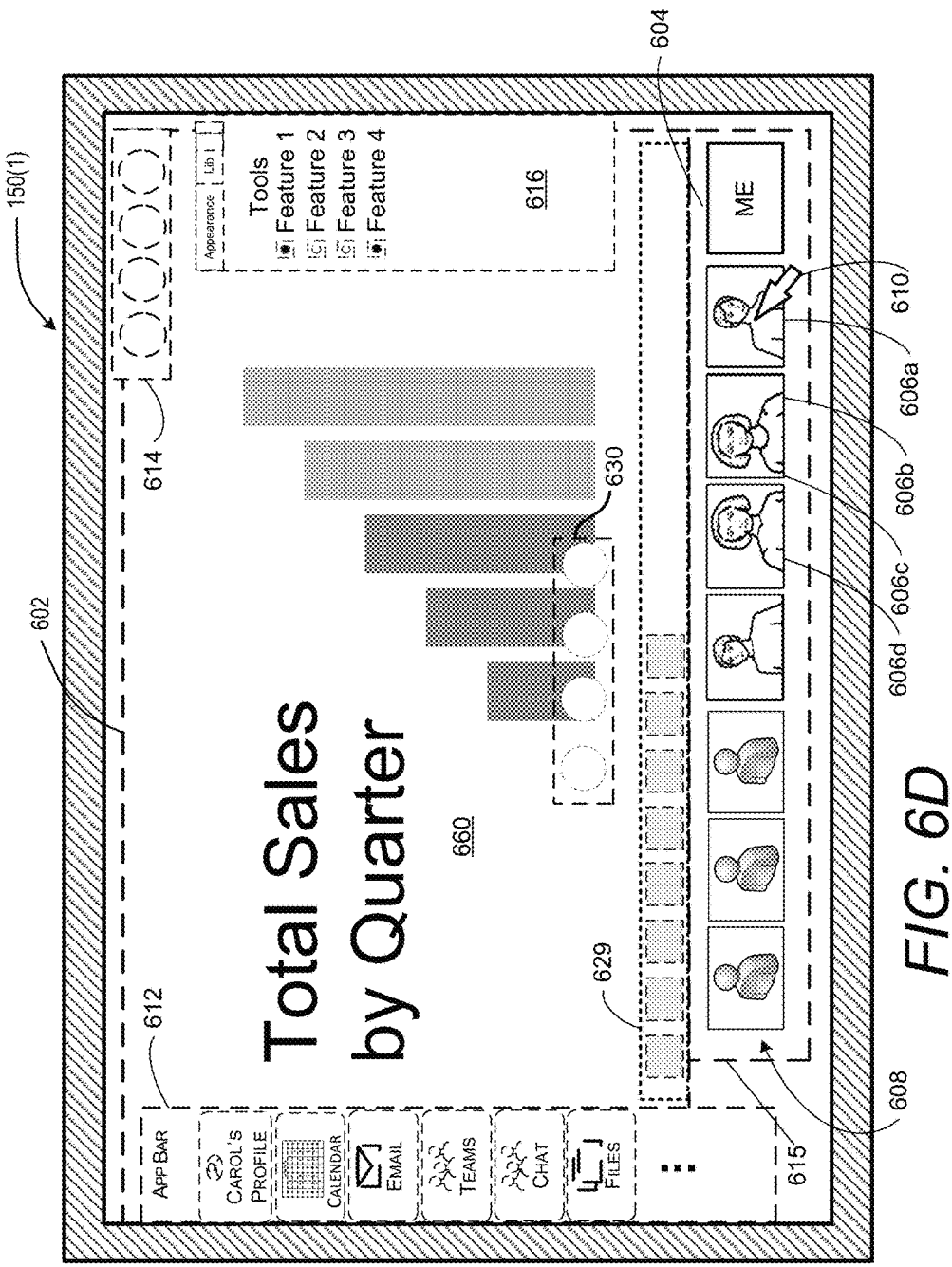

The user's selection of the content user interface element 607 toggles the persistent view in FIG. 6C to display the persistent view of FIG. 6D. FIG. 6D shows the display 150(1) in the persistent view with the content graphic element 650 in the primary section 602 and the active participant user interface elements 606a-d in their secondary section positions.

In an example implementation, the toggling of the view to emphasize the content may be performed while a presenter is sharing either content from an application or content that is the presenter's desktop. The display 150(1) in FIG. 6D includes a task bar 620 positioned to correspond with the position of a task bar in a presenter's desktop while the presenter is sharing his or her desktop with participants in the teleconference. The task bar 629 in FIG. 6D is shown outlined in a dash line surrounding icons representing applications or programs on the presenter's desktop.

Figure 6E:
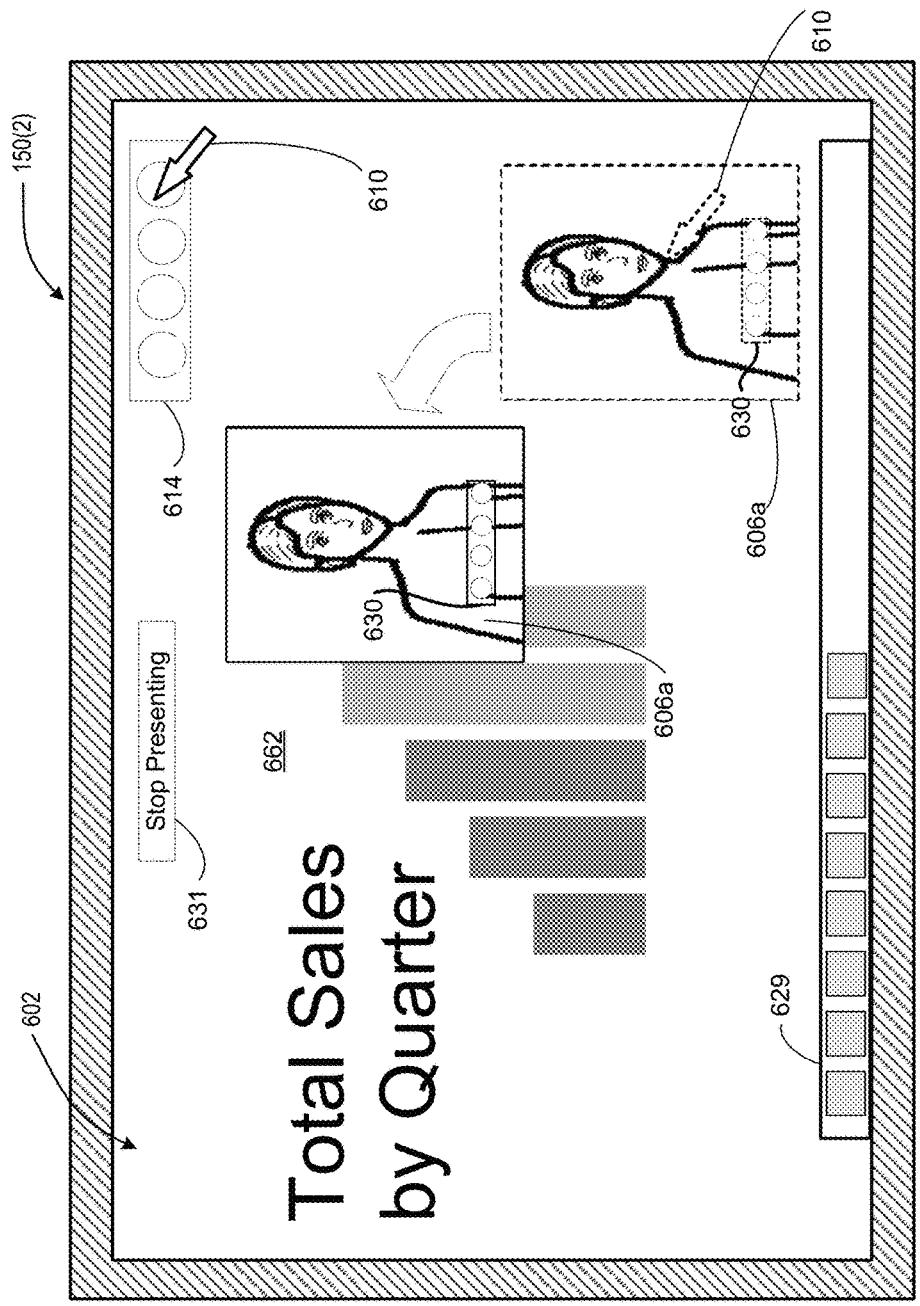
FIG. 6E is a screenshot of a display in a floating monitor view in which a presenter's desktop is shared with other participants in the teleconference session.
Figure 6F:
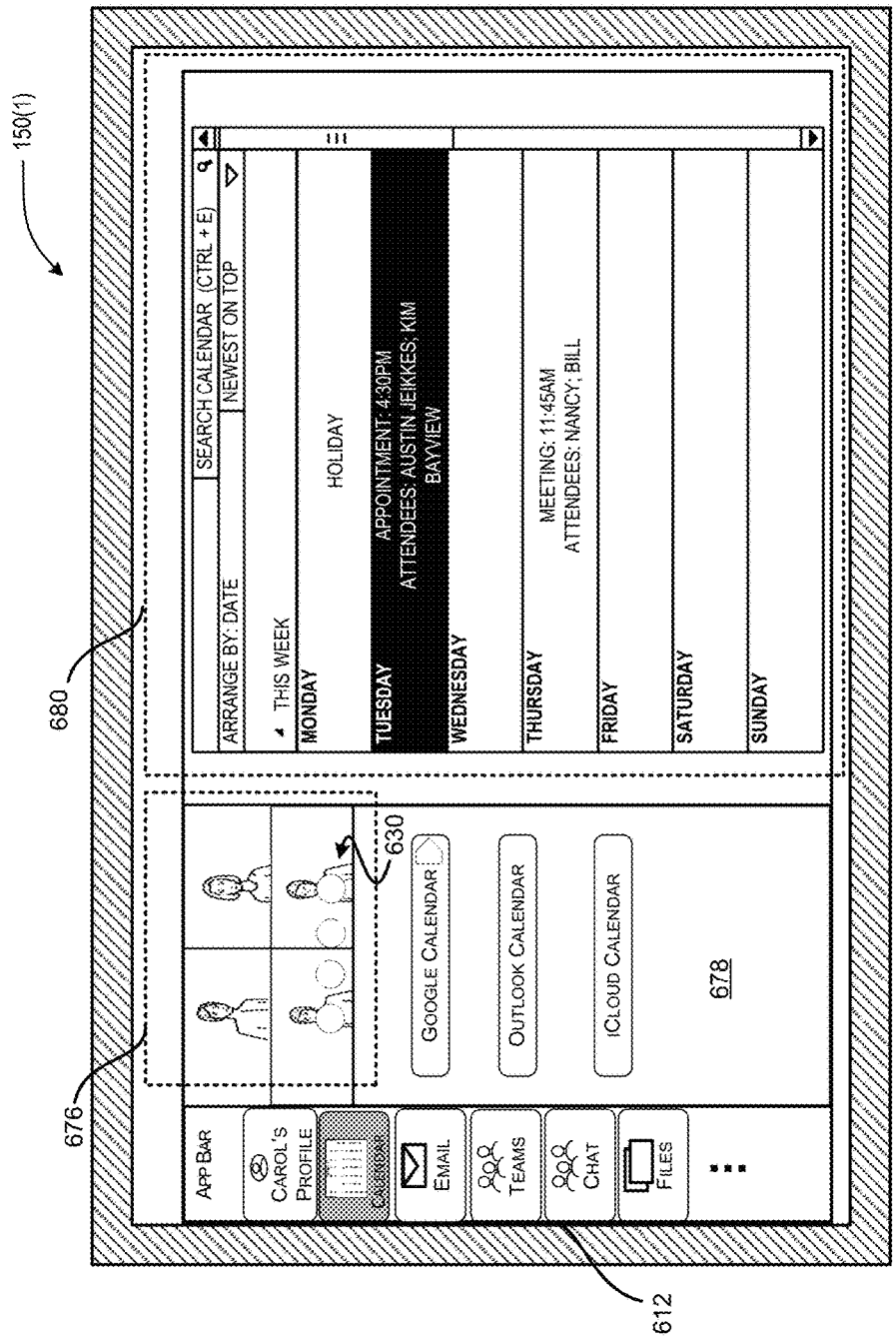
Figure 6G:
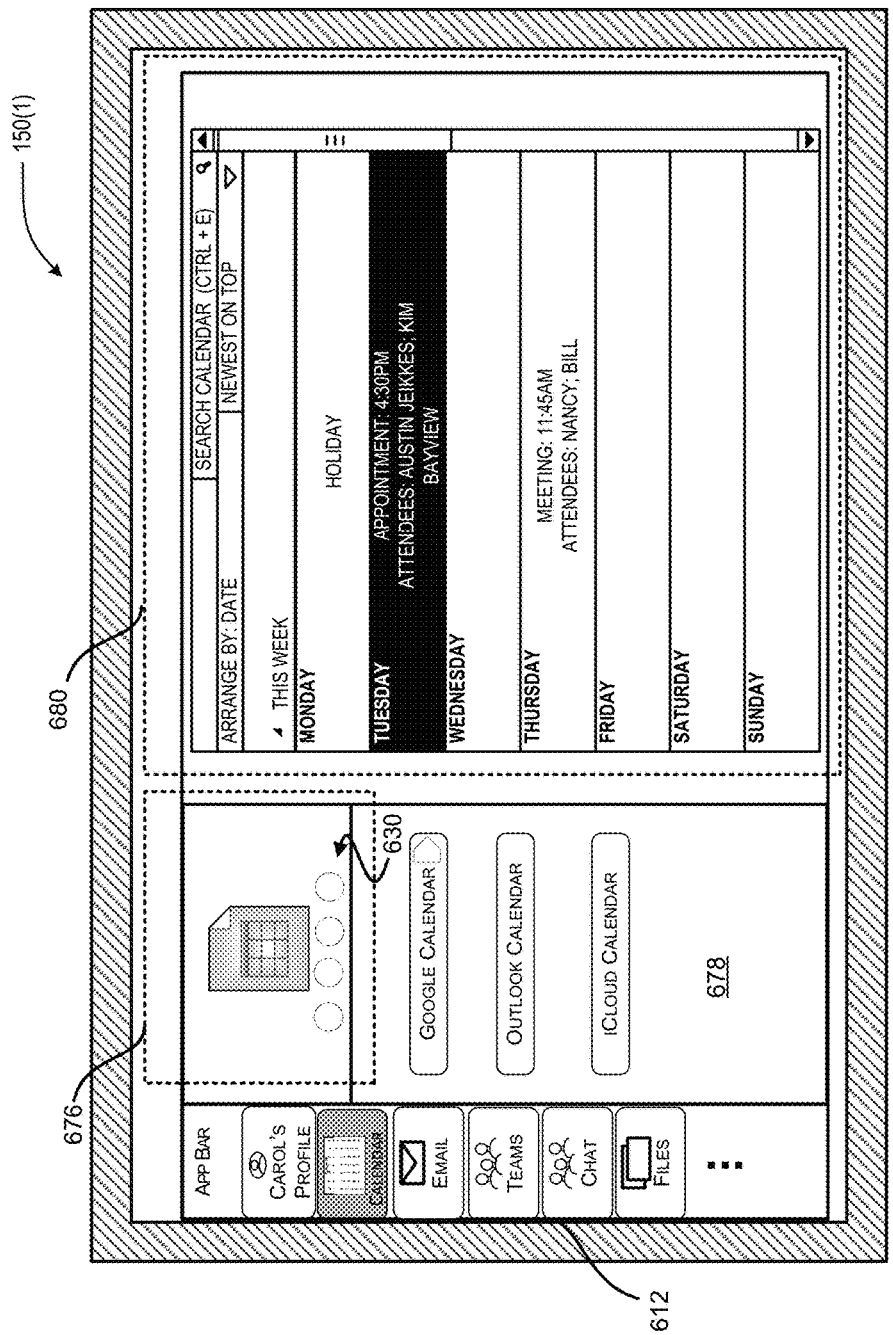

The presenter may share his or her desktop by switching his or her display to a floating monitor view as shown in FIG. 6E. In an example implementation, it can be assumed that a display 150(2) in FIG. 6E is connected to the client computing device 106(2) (shown in FIG. 1) being used by a presenter, or a most dominant participant in the teleconference session. The presenter may be providing content on his or her desktop to share with the other participants. For example, the presenter may be in an application, such as a presentation application 662, e.g. PowerPoint®, which may be running on his or her client computing device 106(2). When the server 136 receives a control signal 156 to switch to the floating monitor view, the view switch function 260 may re-configure the teleconference session view for the presenter at display 150(2) to enable display of the presentation application 662 in the primary section 602. The presenter may establish a connection to transmit a content media data for the application in order to share the application 662 as content.

In a desktop sharing mode, the presenter may share his or her desktop on the display 150(2) using a floating monitor view. The teleconference session view may be re-configured to transmit an image or video comprising the desktop on the display 150(2) of the presenter's client computing device 106(2). The presenter's desktop including the task bar 629 with icons for applications running on the presenter's client computing device 106(2) may then be transmitted as a content media signal 142(2) (in FIG. 1).

The teleconference session view may also minimize, or shrink the display of the teleconference session on the presenter's display 150(1). FIG. 6E includes a floating monitor 606a overlaid on the primary section 602 of the display 150(2). The floating monitor 606a provides the view of the teleconference session. The example in FIG. 6E shows the floating monitor 606a displaying the media corresponding to the presenter, or dominant participant. The floating monitor 606a also includes the core controls 630 for controlling the connection to the session. The display 150(1) in FIG. 6E allows the user to re-position the floating monitor 606a anywhere on the display.

The floating monitor view may also include a presentation control 631 to switch the presentation off (or step presenting). The presenter may select the presentation control 631 to transition the teleconference away from a presentation format. For example, in stopping the presentation, the presenter stops sharing the desktop, and may even stop sharing any application running on the desktop. The display for the presenter (display 150(2)) or for other participants may then switch to an overlay view, or to an audio only teleconference.

The display 150(1) is described as being the display used by the presenter. The server 136 may configure the same view for the participants. When a user desires the floating monitor view in FIG. 8C, the view switching function 260 re-configures that user's teleconference session view to display the presentation application 862 in the primary section 802 of that user's display 150, and to display the floating monitor 806 with the presenter's media data overlaid on the primary section 802. The user may move the floating monitor 806 to any part of the screen using the pointer 810. The floating monitor view allows the presenter share his or her desktop with the other participants.

It is noted that the toggle function may be invoked in other views in which a monitor is overlaid on a desktop that may be running other applications. FIG. 6F is a screenshot of the display 150(1) in a docked monitor view in which display of the teleconference is provided in a monitor 676 positioned in a view of an application that a user invokes using a button on the applications bar 612. The display 150(1) in FIG. 6F shows the user's selection of the calendar application. When the docked monitor view is selected, the server 136 re-configures the teleconference session view for the user that selected the docked monitor view to display the monitor 676 in a dock section 678 of the display 150(1) and to display the calendar application in a primary section 680. The example in FIG. 6F shows the monitor 676 in an overlay view of the active participants in the teleconference. The docked monitor 676 may also display content in an overlay view in a manner similar to the examples described above with reference to FIGS. 4A-4F. The view in the monitor 676 also includes the core controls 630 to provide the user with control over the connection to the teleconference session. The monitor 676 may be viewed as a scaled version of the examples in FIGS. 4A-4F.

In example implementations, the monitor 676 may display a default view of the teleconference when the display 150(1) is switched to the docked view. For example, the display 150(1) may switch to the docked monitor view with the monitor 676 displaying the participants view as shown in FIG. 6F. If there is no content, the monitor 676 may be displayed in the participants view, and if there is content, the monitor 676 may default to the content view as shown in FIG. 6G. If the teleconference session includes content being shared, a user in the docked monitor view may toggle between the participants view in FIG. 6F and the content view in FIG. 6G. The user may toggle between the monitor 676 in FIG. 6F and the monitor 676 in FIG. 6G by, for example, selecting or clicking on the monitor 676.

It is also noted that the monitor 676 in FIGS. 6F and 6G is in a docked position. In an example implementation, the monitor 676 may be lifted off the docked section 678 and moved as described with reference to the floating monitor in FIG. 6E.

FIG. 6H shows the display 150(1) where the client computing device 106(1) is a mobile device, such as for example, a mobile phone. The reference numbers of elements in FIGS. 6A-6G are maintained for like elements in FIGS. 6H-6K. The display 150(1) in FIG. 6H includes a view with a primary section 602 that depicts graphic elements 620a-d similar to the view on the display 150(1) in FIG. 6A, only on a smaller screen. The display 150(1) in FIG. 6H includes a view control bar 614 that includes a set of view switch controls and a set of core controls 630. The view control bar 614 and core controls may be implemented as described above with reference to FIG. 4G-4L. The display 150(1) in FIG. 6H is in the persistent state. The primary section 602 is not displayed substantially edge-to-edge, and a "ME" user interface element 604 and a content user interface element 607 are also displayed in a region that may be deemed a secondary section. The content user interface element 607 is shown in grey with a wide grey border indicating it has been selected. Selection of the content user interface element 607 toggles the view to promote the content media data to the primary section 602 as shown in FIG. 6I. The persistent view in FIG. 6I may be enhanced by display of the "ME" user interface element 604, a dominant participant user interface element 606a, a second active participant user interface element 606b, a third active participant user interface element 606b, and a passive participant user interface element 608.

Figure 6K:
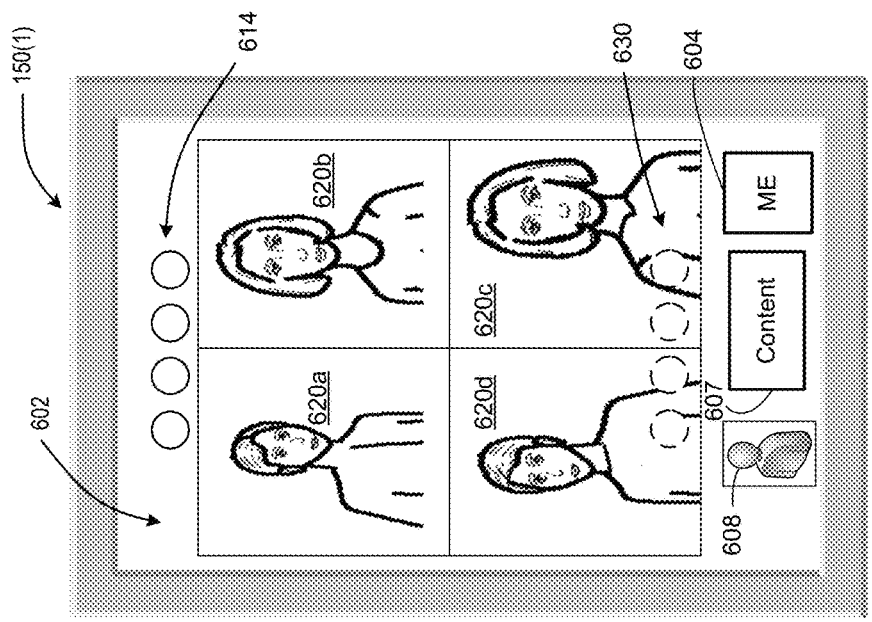
Figure 6J:
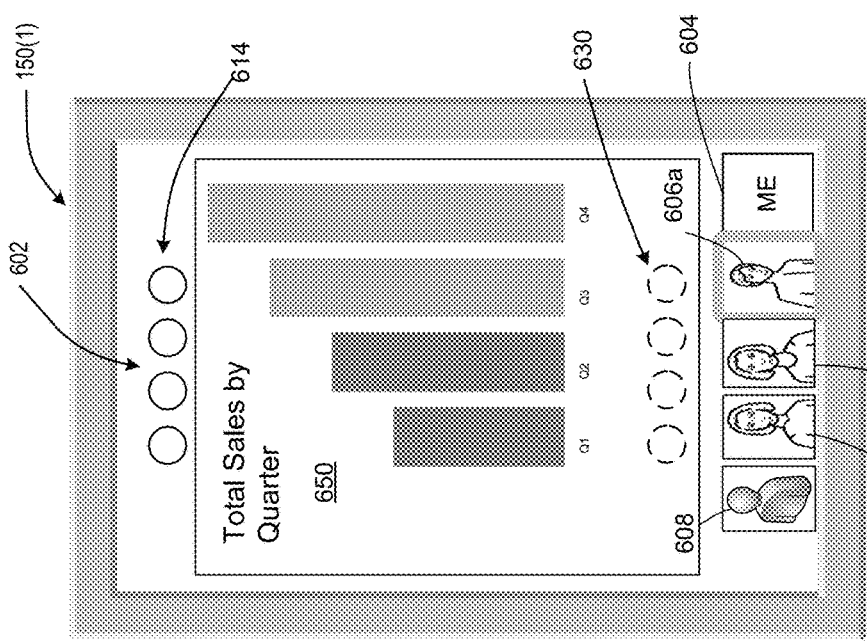

FIG. 6J shows the display 150(1) on the mobile device displaying a view with the primary section 602 that depicts a content graphic element 650 in the persistent view similar to the view on the display 150(1) in FIG. 6I. The display 150(1) in FIG. 6J shows the dominant participant user interface element 606a with a wide grey border indicating it has been selected. The selection of the dominant participant user interface element 606a invokes the toggle view function so that the display 150(1) is changed to the view on the display 150(1) in FIG. 6K. FIG. 6K shows the display 150(1) in the persistent state with the active participant graphic elements 620a-d promoted in the primary section 602.

Figure 7:
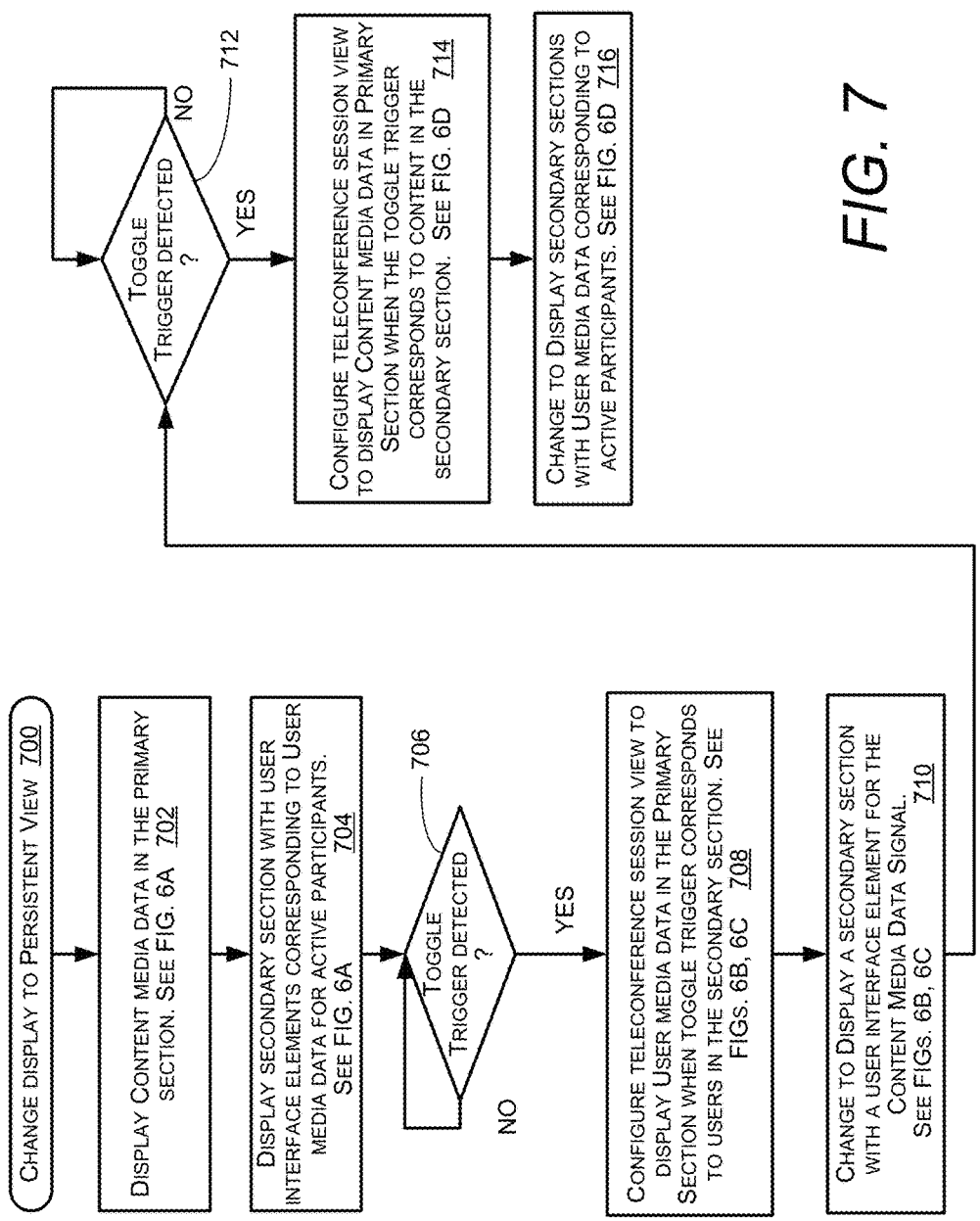
FIG. 7 is a flowchart illustrating operation of a toggle view function with a display in a persistent view.

FIG. 7 is a flowchart illustrating operation of a routine 700 for toggling views when the teleconference session view is in the persistent view. At step 702, a content graphic element corresponding to the content media signal is displayed in the primary section of the display. At step 704, a secondary section is displayed in an area that may be substantially not overlapping the primary section. Such a view is displayed in the screenshot shown in FIG. 6A.

Decision block 706 determines if a toggle actuation has been detected. The toggle actuation may be triggered by the user moving the pointer to select one of the active participant user interface elements. If the toggle actuation is detected (YES path of decision block 706), the display is changed at step 708 to display graphic elements corresponding to the active participants represented by the active participant user interface elements 606a-d. The display is also changed at step 710 to display a content user interface element in the secondary section. Such a view is displayed in the screenshot shown in FIGS. 6B and 6C.

Decision block 712 determines if a toggle actuation is detected. If a toggle actuation is detected (YES path of decision block 712), the display is changed at step 714 to display the content graphic element 650 in the primary section. The display is also changed at step 716 to display the active participant user interface elements 606a-d in the secondary section. Such a view is displayed in the screenshot shown in FIG. 6A.

The disclosure presented herein may be considered in view of the following clauses.

Clause 1, a method 300 for hosting a teleconference session 104 comprising: receiving 302 media data 142 from a plurality of client computing devices 106; combining 304 portions of the media data into a teleconference stream 146 according to a selected teleconference session view 250(1) corresponding to a selected client computing device 106(1) having a display device 150(1), where the selected teleconference session view 250(1) includes a primary section 402, 602 to display a first portion of the teleconference stream 146 and a secondary section 415, 615 configured to display a second portion of the teleconference stream 146, the secondary section including a user interface element 422 having a toggle view function 258 configured to send a toggle control signal when the user selects the user interface element; transmitting 306 the teleconference stream to the selected client computing device 106(1) to display the teleconference stream according to the selected teleconference session view 250(1); receiving the toggle control signal from the selected client computing device 106(1); and changing 312, 314, 316 the selected teleconference session view 250(1) responsive to receiving the toggle control signal to display the second portion of the teleconference stream 450, 660 in the primary section and to display the first portion of the teleconference stream in the secondary section.

Clause 2: the example of clause 1 where: the media data includes user media data 142(1) corresponding to participants of the selected teleconference session and content media data 142(2) corresponding to an audio or video presentation to share with the participants during the selected teleconference session; and in the step of combining the portions of the media data, the first portion of the teleconference stream includes at least a part of the content media data and the second portion of the teleconference stream includes at least a part of the user media data.

Clause 3, the example of clause 1-2 where: in the step of combining the portions of the media data, the at least part of the user media data in the second portion of the teleconference stream includes an audio and video stream in the user media data received from a second client computing device, where the audio video stream is played in the secondary section on the selected display device; and where in the step of changing the selected teleconference session view, the audio video stream is played in the primary section of the selected display device.

Clause 4, the example of clause 1 where: the media data includes user media data 142(1) corresponding to participants of the selected teleconference session and content media data 142(2) corresponding to an audio or video presentation to share with the participants during the selected teleconference session; and in the step of combining the portions of the media data, the first portion of the teleconference stream includes at least a part of the user media data and the second portion of the teleconference stream includes at least a part of the content media data.

Clause 5, the example of clause 1, 4 where: in the step of combining the portions of the media data, the at least part of the user media data in the first portion of the teleconference stream includes an audio and video stream in the user media data received from a second client computing device, where the audio video stream is played in the primary section on the selected display device; and where in the step of changing the selected teleconference session view, the audio video stream is played in the secondary section of the selected display device.

Clause 6, the example of clause 1-5 where the primary section and the secondary section are displayed in substantially non-overlapping portions of the display.

Clause 7, the example of clause 1-6 where: the primary section is displayed to occupy most of the area of the display; and the secondary section does not appear on the display in a user-off state and appears overlaid on the primary section in a user-on state.

Clause 8, the example of clause 7 where the display transitions from a user-on state to a user-off state after an appearance time has elapsed.

Clause 9, the example of clause 7 where the display transitions from a user-off state to a user-on state when motion of an input device that controls a pointer is detected.

Clause 10, the example of clause 7 where at least one of the user interface elements in the secondary section includes a pin selector 426, the method further comprising: identifying a pinned user interface element as the user interface element having the pin selector selected by a user; maintaining the pinned user interface element displayed in both the user-on and user-off states.

Clause 11, a system for hosting a telecommunications session, comprising: one or more processing units 202; and a computer-readable medium 204 having encoded thereon computer-executable instructions to cause the one or more processing units to: receive 302 media data 142 from a plurality of client computing devices 106 at a server 136; combine 304 portions of the media data into a teleconference stream 146 according to a selected teleconference session view 250(1) corresponding to a selected client computing device 106(1) having a display device 150(1), where the selected teleconference session view 250(1) includes a primary section 402, 602 to display a first portion of the teleconference stream 146 and a secondary section 415, 615 configured to display a second portion of the teleconference stream 146, the secondary section including a user interface element 422 having a toggle view function 258 configured to send a toggle control signal when the user selects the user interface element; transmit 306 the teleconference stream to the selected client computing device 106(1) to display the teleconference stream according to the selected teleconference session view 250(1); receive the toggle control signal from the selected client computing device 106(1); and change 312, 314, 316 the selected teleconference session view 250(1) responsive to receiving the toggle control signal to display the second portion of the teleconference stream 450, 660 in the primary section and to display the first portion of the teleconference stream in the secondary section.

Clause 12, the example of clause 11 where the media data includes user media data 142(1) corresponding to participants of the selected teleconference session and content media data 142(2) corresponding to an audio or video presentation to share with the participants during the selected teleconference session, and where the computer-readable medium has encoded thereon computer-executable instructions to cause the one or more processing units to: in the step of combining the portions of the media data, configure the teleconference session view such that the first portion of the teleconference stream includes at least a part of the content media data and the second portion of the teleconference stream includes at least a part of the user media data.

Clause 13, the example of clause 11-12 where the computer-readable medium has encoded thereon computer-executable instructions to cause the one or more processing units to: in the step of combining the portions of the media data, configure the selected teleconference session view such that the at least part of the user media data in the second portion of the teleconference stream includes an audio and video stream in the user media data received from a second client computing device, where the audio video stream is played in the secondary section on the selected display device; and in the step of changing the selected teleconference session view, configure the selected teleconference session view such that the audio video stream is played in the primary section of the selected display device.

Clause 14, the example of clause 11 where the media data includes user media data 142(1) corresponding to participants of the selected teleconference session and content media data 142(2) corresponding to an audio or video presentation to share with the participants during the selected teleconference session, and where the computer-readable medium has encoded thereon computer-executable instructions to cause the one or more processing units to: in the step of combining the portions of the media data, the selected teleconference session view is configured such that the first portion of the teleconference stream includes at least a part of the user media data and the second portion of the teleconference stream includes at least a part of the content media data.

Clause 15, the example of clause 14 where the computer-readable medium has encoded thereon computer-executable instructions to cause the one or more processing units to: in the step of combining the portions of the media data, the at least part of the user media data in the first portion of the teleconference stream includes an audio and video stream in the user media data received from a second client computing device, where the audio video stream is played in the primary section on the selected display device; and where in the step of changing the selected teleconference session view, the audio video stream is played in the secondary section of the selected display device.

Clause 16, the example of clause 11-15 where the teleconference session view configures the primary section and the secondary section to occupy substantially non-overlapping portions of the display.

Clause 17, the example of clause 11-15 where the teleconference session view configures the primary section to occupy most of the area of the display, where the secondary section does not appear on the display in a user-off state and appears overlaid on the primary section in a user-on state.

Clause 18, the example of clause 17 where the teleconference session view is configured to transition from a user-on state to a user-off state after an appearance time has elapsed.

Clause 19, the example of clause 17 where the computer-readable medium has encoded thereon computer-executable instructions to cause the one or more processing units to: configure the teleconference session view to transition from a user-off state to a user-on state when an input device connected to the client computing device to control a pointer element on the display device is controlled to hover over a predetermined area of the display device.

Clause 20, the example of clause 17 where the client computing device includes a touchscreen configured to operate as an input device, where the computer-readable medium has encoded thereon computer-executable instructions to cause the one or more processing units to: configure the teleconference session view to transition from a user- OFF state to a user-ON state when the user touches the touchscreen in a swiping motion.

Clause 21, the example of clause 17 where the client computing device is a mobile device having a touchscreen configured to operate as a first input device, a control button configured to operate as second input device, and the display device, where the computer-readable medium has encoded thereon computer-executable instructions to cause the one or more processing units to: configure the teleconference session view to transition from a user-OFF state to a user-ON state when the user presses the control button.

Clause 22, the example of clause 11-22 where the user interface element in the secondary section includes a pin selector, and where the computer-readable medium has encoded thereon computer-executable instructions to cause the one or more processing units to: identify a pinned user interface element as the user interface element having the pin selector selected by a user; maintain the pinned user interface element displayed in both the user-on and user-off states.

Clause 23, a system comprising: one or more processing units; and a computer-readable medium having encoded thereon computer-executable instructions to cause the one or more processing units to: receive a teleconference stream having portions comprising media data from participants of a teleconference session and from shared content of the teleconference session; display the teleconference stream according to a teleconference session view that includes a primary section in which a first portion of the teleconference stream is rendered and a secondary section in which a user interface element is displayed, where the user interface element displays a rendering of a second portion of the teleconference stream and is associated with a toggle function; perform the toggle function by transmitting a toggle control signal to a server configured to host the teleconference session when a user selects the user interface element; receive the teleconference stream with a re-configured teleconference session view; and change the display according to the re-configured teleconference session view, where the second portion of the teleconference stream is rendered in the primary section and the first portion of the teleconference stream is rendered in the user interface element in the secondary section.

Clause 24, the example of clause 23 where the first portion of the teleconference stream is user media data corresponding to at least one participant of the teleconference session and the second portion of the teleconference stream is content media data corresponding to an audio or video presentation to share with the participants of the teleconference session; and where the computer-readable medium has encoded thereon computer-executable instructions to cause the one or more processing units to: in the step of displaying the teleconference stream, render the user media data corresponding to the at least one participant of the teleconference session in the primary section and render the content media data in the user interface element in the secondary section; and in the step of changing the display according to the re-configured teleconference session view, render the content media data in the primary section and render the user media data in the user interface element in the secondary section.

Clause 25, the example of clause 23-24 where the first portion of the teleconference stream is content media data corresponding to an audio or video presentation to share with the participants of the teleconference session and the second portion of the teleconference stream is user media data corresponding to at least one participant of the teleconference session; and where the computer-readable medium has encoded thereon computer-executable instructions to cause the one or more processing units to: in the step of displaying the teleconference stream, render the content media data in the primary section and render user media data corresponding to the at least one participant of the teleconference session in the user interface element in the secondary section; and in the step of changing the display according to the re-configured teleconference session view, render the user media data in the primary section and render the content media data in the user interface element in the secondary section.

Clause 26, the example of clause 23-25 where the computer-readable medium has encoded thereon computer-executable instructions to cause the one or more processing units to: display the primary section and the secondary section to occupy substantially non-overlapping portions of the display, the primary section occupying a larger area of the display than the secondary section.

Clause 27, the example of clause 23-25 where the computer-readable medium has encoded thereon computer-executable instructions to cause the one or more processing units to: in the step of displaying the teleconference stream, display the primary section to occupy most of the area of the display, where the secondary section does not appear on the display in a user-off state and appears overlaid on the primary section in a user-on state.

Clause 28, the example of clause 27 where the computer-readable medium has encoded thereon computer-executable instructions to cause the one or more processing units to: transition from the user-on state to the user-off state after an appearance time has elapsed.

Clause 28, the example of clause 27 where the computer-readable medium has encoded thereon computer-executable instructions to cause the one or more processing units to: configure the teleconference session view to transition from a user-off state to a user-on state when an input device connected to the client computing device to control a pointer element on the display device is controlled to hover over a predetermined area of the display device.

Clause 29, the example of clause 27 further comprising: a touchscreen configured to operate as an input device, where the computer-readable medium has encoded thereon computer-executable instructions to cause the one or more processing units to configure the teleconference session view to transition from a user-OFF state to a user-ON state when the user touches the touchscreen in a swiping motion.

Clause 30, the example of clause 27 where the client computing device is a mobile device having a touchscreen configured to operate as a first input device, a control button configured to operate as second input device, and the display device, where the computer-readable medium has encoded thereon computer-executable instructions to cause the one or more processing units to: configure the teleconference session view to transition from a user-OFF state to a user-ON state when the user presses the control button.

Clause 31, the example of clause 23-30 where the user interface element in the secondary section includes a pin selector, and where the computer-readable medium has encoded thereon computer-executable instructions to cause the one or more processing units to: identify a pinned user interface element as the user interface element having the pin selector selected by a user; maintain the pinned user interface element displayed in both the user-on and user-off states.

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

We claim:

1. A method for hosting a communication session comprising:

receiving, from a plurality of client devices, user media data corresponding to audio/video (AV) streams of participants of the communication session;

receiving, from at least one client device of the plurality of client devices, content media data corresponding to a digital document to share with the participants during the communication session;

generating a communication stream from the content media data and a plurality of portions of the user media data;

determining an activity level priority associated with multiple individual portions of the communication stream, wherein the activity level priority indicates respective activity levels for individual participants of the communication session and the digital document ranked within the activity level priority based on a number of the participants currently viewing the digital document in a primary section;

selecting for display at least one portion of the communication stream, from the multiple individual portions of the communication stream, based on at least one activity level priority associated with the at least one portion;

combining the plurality of portions of the user media data into the communication stream according to a selected communication session view corresponding to a selected client computing device having a display device, wherein the selected communication session view includes the primary section to display a first portion of the communication stream and a secondary section to display the at least one portion of the communication stream that is selected based on the at least one activity level priority associated with the at least one portion, and wherein the at least one portion of the communication stream that is displayed in the secondary section includes the digital document rendered adjacent to one or more of the audio/video (AV) streams of the participants;

transmitting the communication stream to the selected client computing device for display of the communication stream according to the selected communication session view;

receiving, from the selected client computing device, a toggle control signal that indicates a user selection of the digital document from the secondary section; and responsive to receiving the toggle control signal, changing the selected communication session view to display:

the first portion of the communication stream in the secondary section, and the digital document in the primary section.

2. The method of claim 1, wherein:

the content media data is an audio or video presentation to share with the participants during the communication session; and the first portion of the communication stream includes at least some of the content media data and the at least one portion of the communication stream includes at least some of the user media data.

3. The method of claim 2, wherein:

in the step of combining the plurality of portions of the media data, the at least some of the user media data in the at least one portion of the communication stream includes a particular audio/video stream in the user media data received from a second client computing device, wherein the particular audio/video stream is played in the secondary section on the display device.

4. The method of claim 1, wherein:
the content media data is an audio or video presentation to share with the participants during the communication session; and
the first portion of the communication stream includes at least some of the user media data and the at least one portion of the communication stream includes at least some of the content media data.

5. The method of claim 4, wherein:
in the step of combining the plurality of portions of the media data, the at least some of the user media data in the first portion of the communication stream includes a particular audio/video stream that is received from a second client computing device and that is played in the primary section on the display device; and
wherein in the step of changing the selected communication session view, the particular audio/video stream is played in the secondary section of the display device.

6. The method of claim 1, wherein the primary section and the secondary section are displayed in substantially non-overlapping portions of the display device.

7. The method of claim 1, wherein:
the primary section is displayed to occupy most of an area of the display device; and
the secondary section does not appear on the display device in a user-off state and appears overlaid on the primary section in a user-on state.

8. The method of claim 1, wherein determining the activity level priority associated with the multiple individual portions comprises analyzing at least one aspect of the multiple individual portions including:
participant motion;
participant lip motion;
participant facial expressions;
content modification;
content page turning;
number of participants having the digital document in the primary section;
participant entering communication session; and
participant leaving communication session.

9. A system, comprising:
one or more processing units; and
a computer-readable medium having encoded thereon computer-executable instructions to cause the one or more processing units to:
receive, from a plurality of client devices, user media data corresponding to audio/video (AV) streams of participants of a communication session;
receive, from at least one client device of the plurality of client devices, content media data corresponding to a digital document to share with the participants during the communication session;
generate a communication stream from the content media data and a plurality of portions of the user media data;
determine an activity level priority associated with multiple individual portions of the communication stream, wherein the activity level priority indicates relative activity levels of individual participants of the communication session and the digital document ranked within the activity level priority based on a number of the participants that are currently viewing the digital document in a primary section;
select for display at least one portion of the communication stream, from the multiple individual portions of the communication stream, based on at least one activity level priority associated with the at least one portion;
combine the plurality of portions of the user media data into the communication stream according to a selected communication session view corresponding to a selected client computing device having a display device, wherein the selected communication session view includes the primary section to display a first portion of the communication stream and a secondary section to display the at least one portion of the communication stream that is selected based on the at least one activity level priority associated with the at least one portion, and wherein the at least one portion of the communication stream that is displayed in the secondary section includes the digital document rendered adjacent to one or more of the audio/video (AV) streams of the participants, and wherein the secondary section includes a user interface element having a toggle view function configured to send a toggle control signal when a user selects the user interface element;
transmit the communication stream to the selected client computing device to display the communication stream according to the selected communication session view;
receive the toggle control signal from the selected client computing device, wherein the toggle control signal indicates a user selection of the digital document from the secondary section; and
responsive to receiving the toggle control signal, change the selected communication session view to display:
the first portion of the communication stream in the secondary section, and
the digital document in the primary section.

10. The system of claim 9, wherein the content media data is an audio or video presentation to share with the participants during the communication session.

11. The system of claim 9, wherein the computer-readable medium has encoded thereon computer-executable instructions to cause the one or more processing units to:
configure the selected communication session view such that at least part of the user media data in the at least one portion of the communication stream includes a particular audio/video stream that is played in the secondary section on the display device; and
in the step of changing the selected communication session view, configure the selected communication session view such that the particular audio/video stream is played in the primary section of the display device.

12. The system of claim 9, wherein the content media data is an audio or video presentation to share with the participants during the communication session, and where the computer-readable medium has encoded thereon computer-executable instructions to cause the one or more processing units to:
in the step of combining the plurality of portions of the media data, the selected communication session view is configured such that the first portion of the communication stream includes at least a part of the user media data and the at least one portion of the communication stream includes at least a part of the content media data.

13. The system of claim 12, wherein:
in the step of combining the plurality of portions of the media data, the at least part of the user media data in the first portion of the communication stream includes a particular audio/video stream in the user media data received from a second client computing device, where the particular audio/video stream is played in the primary section on the display device; and
where in the step of changing the selected communication session view, the particular audio/video stream is played in the secondary section of the display device.

14. The system of claim 9, wherein the selected communication session view configures the primary section and the secondary section to occupy substantially non-overlapping portions of the display device.

15. The system of claim 9, wherein the selected communication session view configures the primary section to occupy most of the area of the display device, and wherein the secondary section does not appear on the display device in a user-off state and appears overlaid on the primary section in a user-on state.

16. The system of claim 15, wherein the selected communication session view is configured to transition from a user-on state to a user-off state after an appearance time has elapsed.

17. A system, comprising:
one or more processing units; and
a computer-readable medium having encoded thereon computer-executable instructions to cause the one or more processing units to:
receive a communication stream having content media data corresponding to a digital document to share with participants of a communication session and a plurality of portions of user media data corresponding to audio/video (AV) streams of the participants of the communication session;
receive data indicating an activity level priority that is indicative of relative activity levels of the participants of the communication session and the digital document ranked within the activity level priority based on a number of the participants that are currently viewing the digital document in a primary section;
select for display the digital document based on a ranking of the digital document within the activity level priority;
display a rendering of the communication stream according to a communication session view that includes a primary section and a secondary section, wherein a first portion of the communication stream is rendered in the primary section and wherein a user interface element is displayed in the secondary section, where the user interface element displays a rendering of the digital document, and wherein the user interface element is associated with a toggle function;
initiate the toggle function by transmitting a toggle control signal to a server configured to host the communication session in response to a user selection of the user interface element that displays the rendering of the digital document;
receive the communication stream with a re-configured communication session view; and
change the rendering according to the re-configured communication session view by displaying the digital document in the primary section and the first portion in the secondary section.

18. The system of claim 17, wherein the first portion of the communication stream is user media data corresponding to at least one participant of the communication session; and where the computer-readable medium has encoded thereon computer-executable instructions to cause the one or more processing units to:
in the step of displaying the communication stream, render the user media data corresponding to the at least one participant of the communication session in the primary section and render the digital document in the user interface element in the secondary section.

19. The system of claim 17, wherein the computer-readable medium has encoded thereon computer-executable instructions to cause the one or more processing units to:
display the primary section and the secondary section to occupy substantially non-overlapping portions of the rendering, the primary section occupying a larger area of the display device than the secondary section.

20. The system of claim 17, wherein the computer-readable medium has encoded thereon computer-executable instructions to cause the one or more processing units to:
in the step of displaying the communication stream, display the primary section to occupy at least half of an area of the rendering, where the secondary section does not appear on the display in a user-off state and appears overlaid on the primary section in a user-on state.

21. The system of claim 17, wherein the ranking of the digital document within the activity level priority is based on a number of participants having the digital document in the primary section.

* * * * *